(12) United States Patent
Weinberg et al.

(10) Patent No.: US 7,143,339 B2
(45) Date of Patent: Nov. 28, 2006

(54) METHOD AND APPARATUS FOR DYNAMICALLY FORMATTING AND DISPLAYING TABULAR DATA IN REAL TIME

(75) Inventors: Paul N. Weinberg, Los Angeles, CA (US); Ariel Hazi, Los Angeles, CA (US); Dave L. Sullivan, Canoga Park, CA (US); Philip A. Tinari, Beverly Hills, CA (US); Alexander K. Alexandrov, Sherman Oaks, CA (US); David E. Brookler, Los Angeles, CA (US)

(73) Assignee: SAP Aktiengesellschaft, Waldorf (DE)

( * ) Notice: Subject to any disclaimer, the term of this patent is extended or adjusted under 35 U.S.C. 154(b) by 627 days.

(21) Appl. No.: 09/960,541

(22) Filed: Sep. 20, 2001

(65) Prior Publication Data

US 2002/0116417 A1 Aug. 22, 2002

Related U.S. Application Data

(60) Provisional application No. 60/234,015, filed on Sep. 20, 2000.

(51) Int. Cl.
*G06F 17/00* (2006.01)

(52) U.S. Cl. .............. 715/503; 715/504; 715/509
(58) Field of Classification Search ........ 715/500, 715/503, 504, 509
See application file for complete search history.

(56) References Cited

U.S. PATENT DOCUMENTS

| | | | | |
|---|---|---|---|---|
| 5,317,686 A | * | 5/1994 | Salas et al. | 715/503 |
| 5,604,854 A | * | 2/1997 | Glassey | 715/503 |
| 5,713,020 A | * | 1/1998 | Reiter et al. | 707/102 |
| 5,915,257 A | * | 6/1999 | Gartung et al. | 715/503 |
| 5,961,923 A | * | 10/1999 | Nova et al. | 422/68.1 |
| 6,298,342 B1 | * | 10/2001 | Graefe et al. | 707/4 |
| 6,321,241 B1 | * | 11/2001 | Gartung et al. | 715/503 |
| 6,329,139 B1 | * | 12/2001 | Nova et al. | 435/6 |
| 6,340,588 B1 | * | 1/2002 | Nova et al. | 435/287.1 |
| 6,411,313 B1 | * | 6/2002 | Conlon et al. | 715/769 |
| 6,604,095 B1 | * | 8/2003 | Cesare et al. | 707/1 |
| 6,626,959 B1 | * | 9/2003 | Moise et al. | 715/522 |

OTHER PUBLICATIONS

Pearson, Excel Version 5 for Windows, Special Edition, published in 1993 by Que Corporation, pp. 983-1039.*
International Search Report for PCT/US01/29486, the PCT version of U.S. Appl. No. 09/960,541 (see attached).

* cited by examiner

*Primary Examiner*—Stephen Hong
*Assistant Examiner*—Gregory J. Vaughn
(74) *Attorney, Agent, or Firm*—Dalina Law Group P.C.

(57) ABSTRACT

Embodiments of the invention improve upon current systems by allowing users to dynamically generate and repeatedly modify the appearance of any set of tabular data. When the system obtains input relating to formatting the table, the appearance of the table is dynamically modified so the users can instantaneously view any changes to the table caused by the input (e.g., WYSIWYG). Users provide input (e.g., layout information) that relates to various types of pivot operations, sorting operation, and/or merging operations performed on the table. The user may, for example, select a certain field and then initiate a pivot operation using the selected field. The system is configured in accordance with one embodiment of the invention so that the layout information is stored independent of and/or associated with the table data.

27 Claims, 9 Drawing Sheets

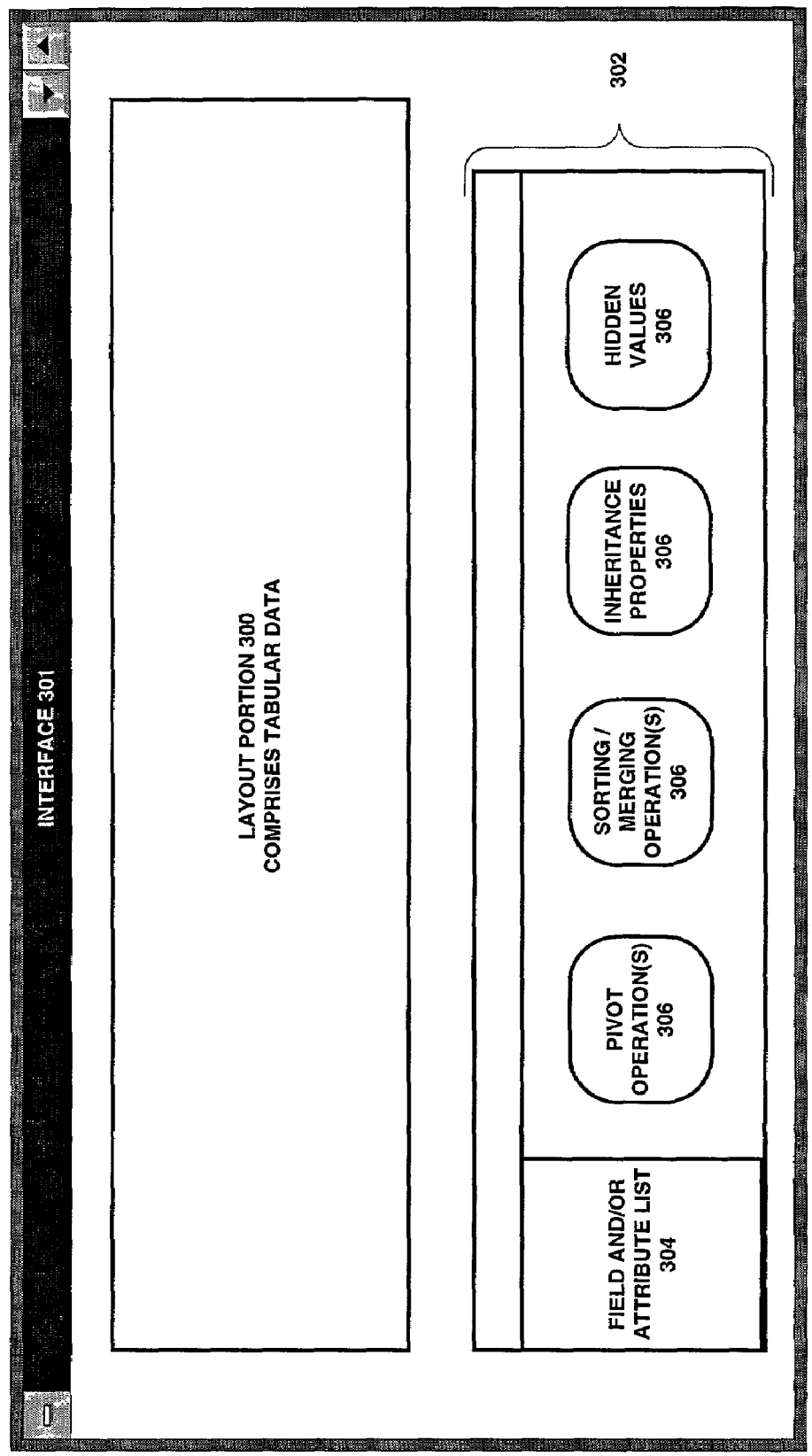

Figure 4

Family Layout

Category: Film
Manufacturer Name: Kodak

| Model | Main Picture | Film Speed | Exposures | Film Type | Price 1 |
|---|---|---|---|---|---|
| F-35-100-12 | | 100 | 12 | 35 mm | $2.50 |
| F-35-400-12 | | 400 | 12 | 35 mm | $2.50 |
| F-35-200-12 | | 200 | 12 | 35 mm | $2.50 |

⎫ 400

Layout Detail | Column Names

Available fields/attributes:
- Description
- Weight
- Main Picture
- Manufacturer Name
- Test Log
- *Film Speed*
- *Exposures*
- *Film Type*
- <more>
- Price 1

[Add] [Remove] [Inherit All]

Layout options:
- Stack Pivots
  - Vertical Pivots
  - Horizontal Pivots
  - Sort Options
  - Hidden

⎫ 404

☐ Inherit display order
☐ Inherit display options
← Inherit stack pivots — 408

402

358 Families    Layout Mode

STACK (DEPTH) PIVOT
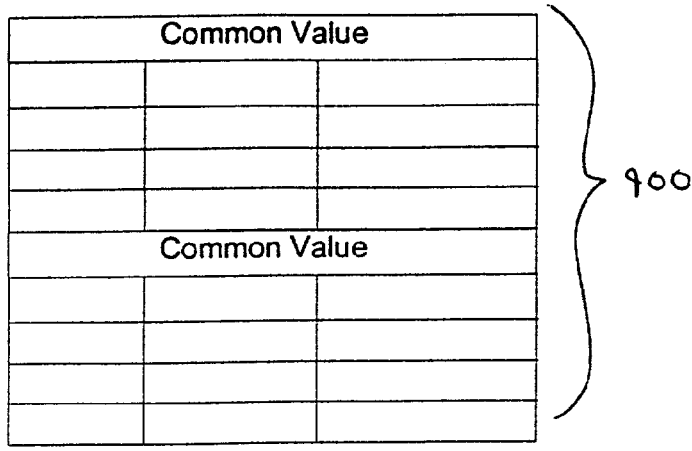
Figure 9
VERTICAL (ROW) PIVOT
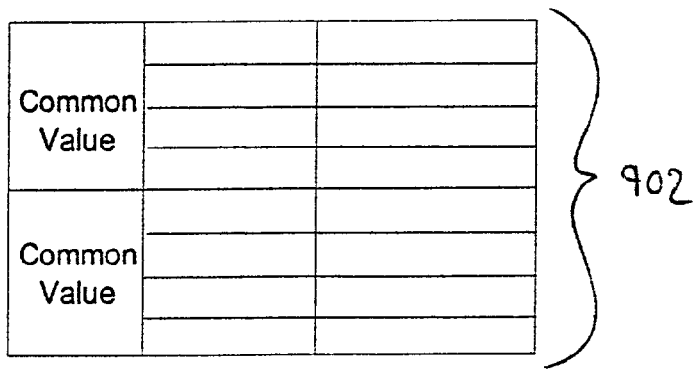
HORIZONTAL (COLUMN) PIVOT
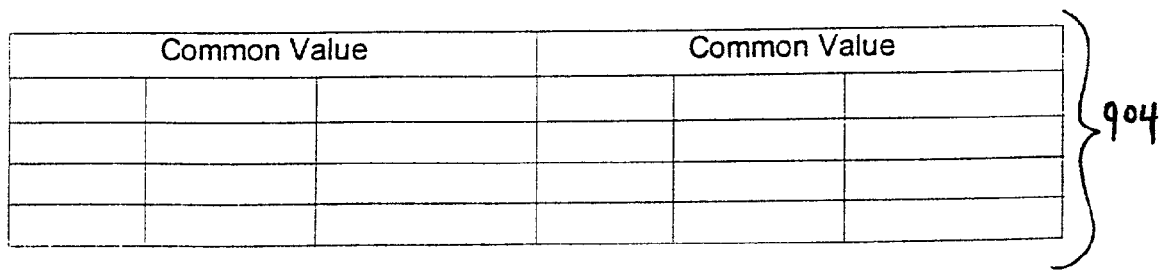

METHOD AND APPARATUS FOR DYNAMICALLY FORMATTING AND DISPLAYING TABULAR DATA IN REAL TIME

This non-provisional application takes priority from U.S. Provisional Application No. 60/234,015 filed on Sep. 20, 2000.

BACKGROUND OF THE INVENTION

1. Field of the Invention

This invention relates to the field of computer software. More specifically, the invention relates to a method and apparatus for dynamically formatting and displaying tabular data in real time.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyrights whatsoever.

2. Background

Presenting data records in tabular form (e.g., as a set of rows each with the same number and types of column) is a well-known way to compactly represent large quantities of information. As a result, people frequently present data records (e.g., printed or displayed) using tables to convey different kinds of information. Product catalogs, for example, typically contain a large number of tables representative of the various product alternatives available in the catalog. The following example illustrates the effectiveness of using a table to describe multiple aspects of a product line.

|  | 100 | | 200 | | 400 | |
| --- | --- | --- | --- | --- | --- | --- |
| Exposures | Model | Price 1 | Model | Price 1 | Model | Price 1 |
| 12 | F-35-100-12 | $2.50 | F-35-200-12 | $2.50 | F-35-400-12 | $2.50 |
| 24 | F-35-100-24 | $3.75 | F-35-200-24 | $3.75 | F-35-400-24 | $3.75 |
| 35 | F-35-100-36 | $4.25 | F-35-200-36 | $4.25 | F-35-400-36 | $4.25 |

Computer software programs such as Quark Express™, PageMaker™, Microsoft Word™, Microsoft Excel™, and many others provide mechanisms for generating such tables. However, the approach these program use to manipulate table data is cumbersome and lacks flexibility. Although it is possible to generate and format tables using these programs, the process for doing so is unnecessarily laborious. For example, in most case users are required to manually provide numerous commands relating to each cell, row, or column of information in the table. Any page layout having a table must be meticulously laid out with existing page layout programs a page at a time and formatted a table at a time by manually populating page layouts with product data, a process that is time-consuming, tedious and very, very expensive. There is also no easy way to experiment with different tabular layout formats and views of the data, and once a page has been laid out, it is difficult to add or remove records from the tables without destroying the structure of the page and requiring that it be laid out again (sometimes from scratch) which discourages updates and means that catalog pages tend to quickly become out-of-date.

The upside of this complex process, however, is that manual page layout usually results in high page density, flexible and well-structured tabular layout formats using pivots to eliminate redundant information, and a very high overall standard of quality. Notwithstanding the high level of quality, however, it remains difficult to enforce a uniform look throughout a publication because more than one person is usually involved in the page layout process, and each lays out pages somewhat differently. If formatting changes are made (e.g., a row or column is moved, filtered, or sorted), the changes become permanent once the file is saved into persistent memory. Some programs have an undo command that enables users to undo formatting commands in sequence while the document is still in transient memory (e.g., RAM), but the undo command cannot remove commands out of sequence nor can it operate once the file is saved into persistent memory.

By contrast, electronic catalog pages are typically database-driven and generated programmatically in real-time. Since page layouts do not actually exist until the electronic catalog page is displayed, new products can be added and old products removed without disturbing the system or the published output. Unfortunately, the downside of this flexibility is that automatically generated electronic catalog pages are usually no more than wide, ugly, "spreadsheet-style" tables of data with redundant information, very little structure, and none of the sophisticated tabular layout formats that are standard for paper pages. With category-specific attributes and a large number of categories, it is even more impractical to have a customized hand-coded display for each family, so generic unstructured presentations are even more the norm.

Moreover, when publishing to multiple media, none of the effort invested in meticulously laying out paper pages can be leveraged for the electronic catalog, since both the structure of the tabular layout formats as well as the product data are typically trapped within the page layout itself, while the electronic catalog requires that the data be stored and managed in a database to be searchable and generated in real-time. Thus the worlds of the two media are completely distinct and non-overlapping, very difficult to integrate, and require two distinct publishing efforts.

Another problem existing programs for manipulating table data have is that these programs lack a mechanism for dynamically formatting table data in real time. For example, existing programs do not automatically modify the layout of a table in real time upon receipt of formatting commands from the user. Thus, users cannot instantaneously view changes made to the table at the time such changes are made. This limits the users ability to incrementally change the various formatting options until a satisfactory visual appearance is achieved.

Many database programs have the ability to present different views of data. For instance, most Relational Database Management Systems (RDBMS) include report writers that provide a platform for publishing information stored in the database as formatted presentations with simple tabular layout formats. Those of ordinary skill in the art are familiar with techniques for instructing such report writers to combine information from records in multiple tables, format the common information associated with each family in a structured way, and finally sort the records of tabular information. This approach works well with a relational database in which the field structure and the set of fields is consistent across the entire set of records, the field definitions are relatively static, and the number of fields is limited; because each field applies across the entire database, special handling and formatting for a particular field or fields is coded only once rather than multiple times.

By contrast, in a database with category-specific attributes, the field structure and set of fields differs for the records of each category. Thus, the report writer needs to be coded with specific intelligence about how to handle attributes on a category-by-category basis. If there are a large number of categories and attributes, this can be extremely tedious, time-consuming, and error prone to implement. The report writer must then be recoded each time changes are made to the taxonomy structure (e.g., organizational structure) and/or the set of attributes associated with each category, which makes the report writer approach difficult to maintain as the taxonomy changes over time.

Moreover, using existing report writers (or HTML) to present and structure tabular information more efficiently using pivot columns is a manual process that requires programming expertise that is beyond the capability of most average users. It is also data-dependent, so that even if the report writer can be used to create the pivot tables, the code then needs to be rewritten to reflect the data each time changes are made to the underlying records. Moreover, if each family requires a different tabular layout format because of category-specific attributes, then the particular tabular layout format for each family must be individually coded in the report writer, substantially increasing the coding complexity.

The issues identified above become particularly problematic when publishing catalogs that contain tables of product information. The manner in which catalogs are typically published is a laborious process that involves the manual entry of data and layout of the catalog. Such processes keep the cost of producing catalog or any other publication unnecessarily high. Thus there is a need for a system that dramatically reduces the cost of laying out tabular data by flexibly, programmatically, and automatically generating page layouts in real time. cl SUMMARY OF THE INVENTION Embodiments of the invention improve upon current systems by allowing users to dynamically generate and repeatedly modify the appearance of any set of tabular data. When the system obtains input relating to formatting the table, the appearance of the table is dynamically modified so the users can instantaneously view any changes to the table caused by the input (e.g., WYSIWYG). The system accepts various types of input and upon receipt of that input the system changes the appearance of the table in accordance with the input provided. Thus, the user may repeatedly modify the table by providing different or additional input and viewing the results of the input. This enables users to fluidly add, remove, and/or otherwise manipulate layout values associated with the table.

In one embodiment of the invention, the user input (e.g., layout information) relates to various types of pivot operations, sorting operation, and/or merging operations performed on the table. The user may, for example, select a certain field and then initiate a pivot operation using the selected field. The system is configured in accordance with one embodiment of the invention so that the layout information is stored independent of the table data. This arrangement enables the system to apply the layout information to any set of tabular data, even if that data was not used to determine the layout. Additionally, the system can manipulate the tabular data set without changing the underlying structure of the data. The layout information can also be associated with or dependent on a particular set of tabular data and stored along with that data. In this instance, the layout information is part of a file or set of files related to the tabular data.

DESCRIPTION OF THE DRAWINGS

FIG. 3 illustrates the components of a graphical user interface configured in accordance with an embodiment of the invention.

FIG. 4 illustrates a tabular data set before the execution of any pivot operations in accordance with an embodiment of the invention.

FIG. 9 is a generalization of several pivot operations in accordance with an embodiment of the invention.

DETAILED DESCRIPTION

Figure 1:
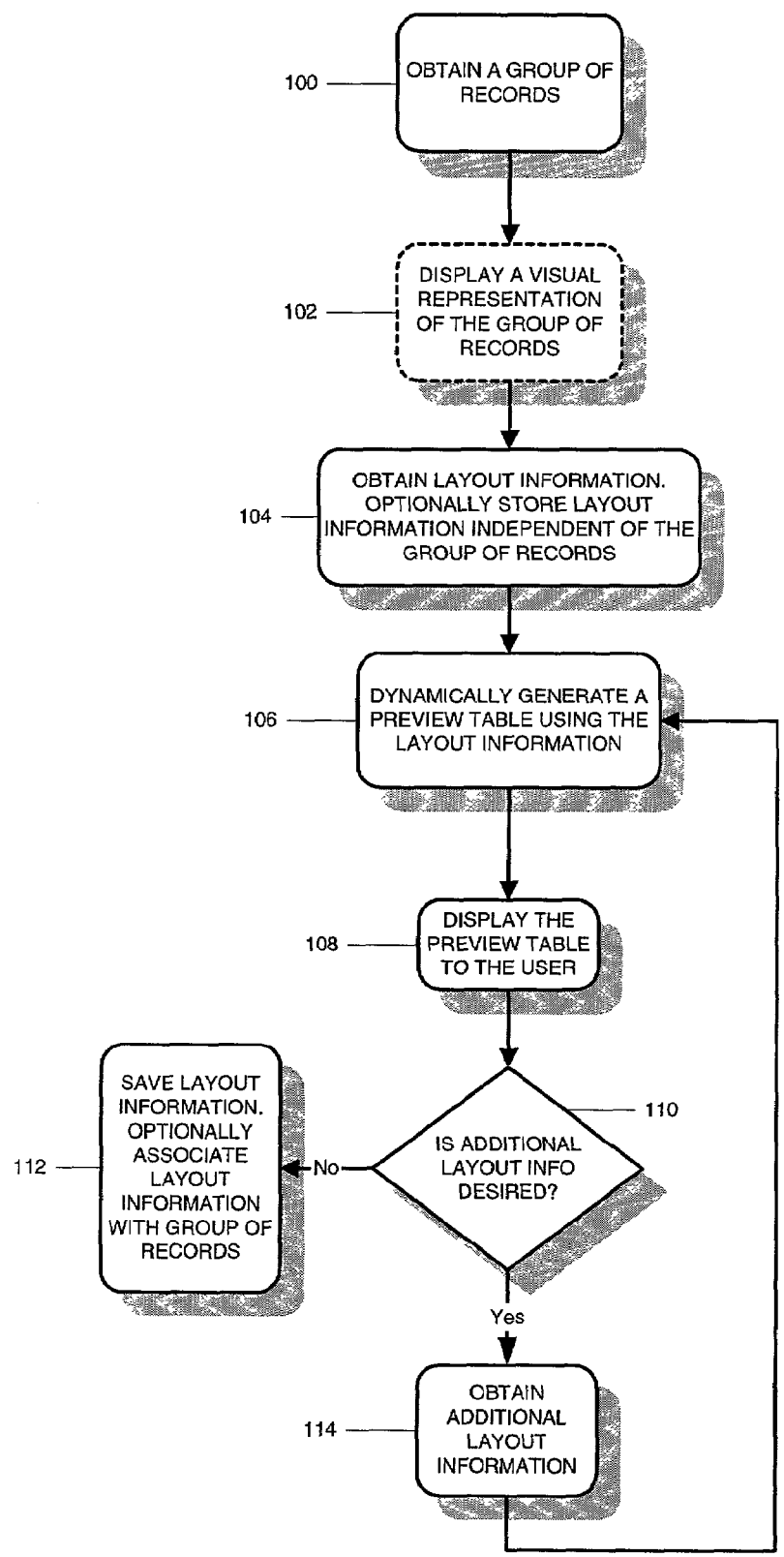
FIG. 1 is a flow chart that illustrates the process for enabling systems to implement one or more embodiments of the invention.

An embodiment of the invention comprises a method and apparatus for dynamically formatting any type of table data that further extends upon current systems by providing users with a flexible interface for manipulating the table data in real time. In the following description numerous specific details are set forth in order to provide a more thorough understanding of the present invention. It will be apparent, however, to one skilled in the art, that the present invention may be practiced without these specific details. In other instances, well-known features have not been described in detail so as not to obscure the invention. The reader should note that although certain details are set for the herein, the claims and the full scope of any equivalents is what defines the invention.

System Overview:

Embodiments of the invention improve upon current systems by allowing users to dynamically generate and repeatedly modify the appearance of any set of tabular data. If the tabular data comprises records having a defined association, the appearance of the table can be modified while still maintaining the integrity of the relationships between fields and/or attributes in the table. For instance, if the data contained in a table represents a set of records sharing a common value (e.g., a field and/or attribute), the relationship to the common value can be maintained while still allowing users to freely modify the appearance of the table. However, the invention is not limited to manipulating records sharing a common value and systems embodying the invention can also manipulate table data that does not have any defined relationships. The invention therefore has applicability across multiple types of computer programs (e.g., word processing, spreadsheets, databases, desktop publishing, and any other program where visually manipulated tabular data is desirable).

When the system obtains input relating to formatting the table, the appearance of the table is dynamically modified so the users can instantaneously view any changes to the table caused by the input (e.g., WYSIWYG). The system accepts various types of input and upon receipt of that input the system changes the appearance of the table in accordance with the input provided. Thus, the user may repeatedly modify the table by providing different or additional input and viewing the results of the input. This enables users to fluidly add, remove, and/or otherwise manipulate layout values associated with the table.

In one embodiment of the invention, the user input (e.g., layout information) relates to various types of pivot operations, sorting operation, and/or merging operations performed on the table. The user may, for example, select a certain field and then initiate a pivot operation using the selected field. The specifics of each pivot operation are discussed in further detail below. However, generally speaking the goal of each pivot operation is to reduce the amount of redundant information shown in the table by manipulating the data contained therein.

The system is configured in accordance with one embodiment of the invention so that the layout information is stored independent of the table data. This arrangement enables the system to apply the layout information to any set of tabular data, even if that data was not used to determine the layout. Additionally, the system can manipulate the tabular data set without changing the underlying structure of the data.

The process for enabling system to implement one or more embodiments of the invention is illustrated in FIG. 1. The process initiates when a computer obtains a group of records for purposes of formatting (see e.g., FIG. 1, step 100). These records may or may not be related by at least one common value. When records in a table are related by one or more common values, the group of records is referred to as a family. The invention contemplates the use of families defined in many different ways. Some examples, of families utilized by embodiments of the invention are further described in co-pending patent application entitled "DATA INDEXING USING BIT VECTORS" U.S. Ser. No. 09/643, 316 which is incorporated herein by reference. Further detail about the hierarchical structure associated with a family can also be found in the co-pending patent application entitled "METHOD AND APPARATUS FOR STRUCTURING, MAINTAINING, AND USING FAMILIES OF DATA", which is also incorporated herein by reference.

Once the group of records is obtained by the system (see e.g., step 100) a visual representation of the records can be presented to the user for modification. For instance, the system may display a subset of the group of records (e.g., step 102) that may include a visual representation of the records associated with the entire family or a portion of the family. So that the user can view the layout of the group of records in a tabular format, the records are initially presented in a table. Upon viewing the group of records the user may provide the system with layout information (e.g., step 104). In one embodiment of the invention, the layout information is utilized to rearrange or modify the data in the table. This layout information can be stored independent of the data contained in the table. The layout information is associated with the table data in that the user may select field names or attributes names that are utilized as the values for performing various layout operations. However, the layout information can be generalized so that the operations defined therein can be applied to any set of tabular data regardless of the field and/or attributes values of the data.

Some examples of the types of operations defined in the layout information include pivot operation such as stack pivots, horizontal pivots, vertical pivots, sorting information, merging information, inheritance properties, and field and/or attributes values to be hidden from view. If, for example, the user selects a field name the selected field name can be used as the basis for one or more pivot operations. The specific characteristics of each pivot operation will be described in further detail below.

Once the system obtains the layout information, the table is dynamically updated to reflect the changes made (see e.g., steps 106 and 108). The user may continue to add, remove, or otherwise modify the layout information (see e.g., steps 110) in order to determine how such modifications change the view of the table. The updated table (which may be referred to as a preview table), may contain a less redundant set of records than the initial table. Certain records having redundant information may be repositioned, merged together, or removed from the table. In the event that providing certain layout information makes the table more complex or confusing to the user, the user can dynamically modify the table by removing the layout information that added such complexity. Once the user determines that additional layout information is not desirable, the layout information obtain from the user to generate the preview table can be saved and optionally associated with the appropriate group of records. This way the user can easily recreate the table without having to provide the same layout information again. If the preview table is to be used by another program (e.g., a publication program), the table can be exported to that program. If, for instance, the user is designing tables for a catalog, the user can provide the finalized table to the catalog publication program. If the table is not in a satisfactory format, the user can continue modifying the table while dynamically viewing the changes until a satisfactory result is achieved.

Figure 2:
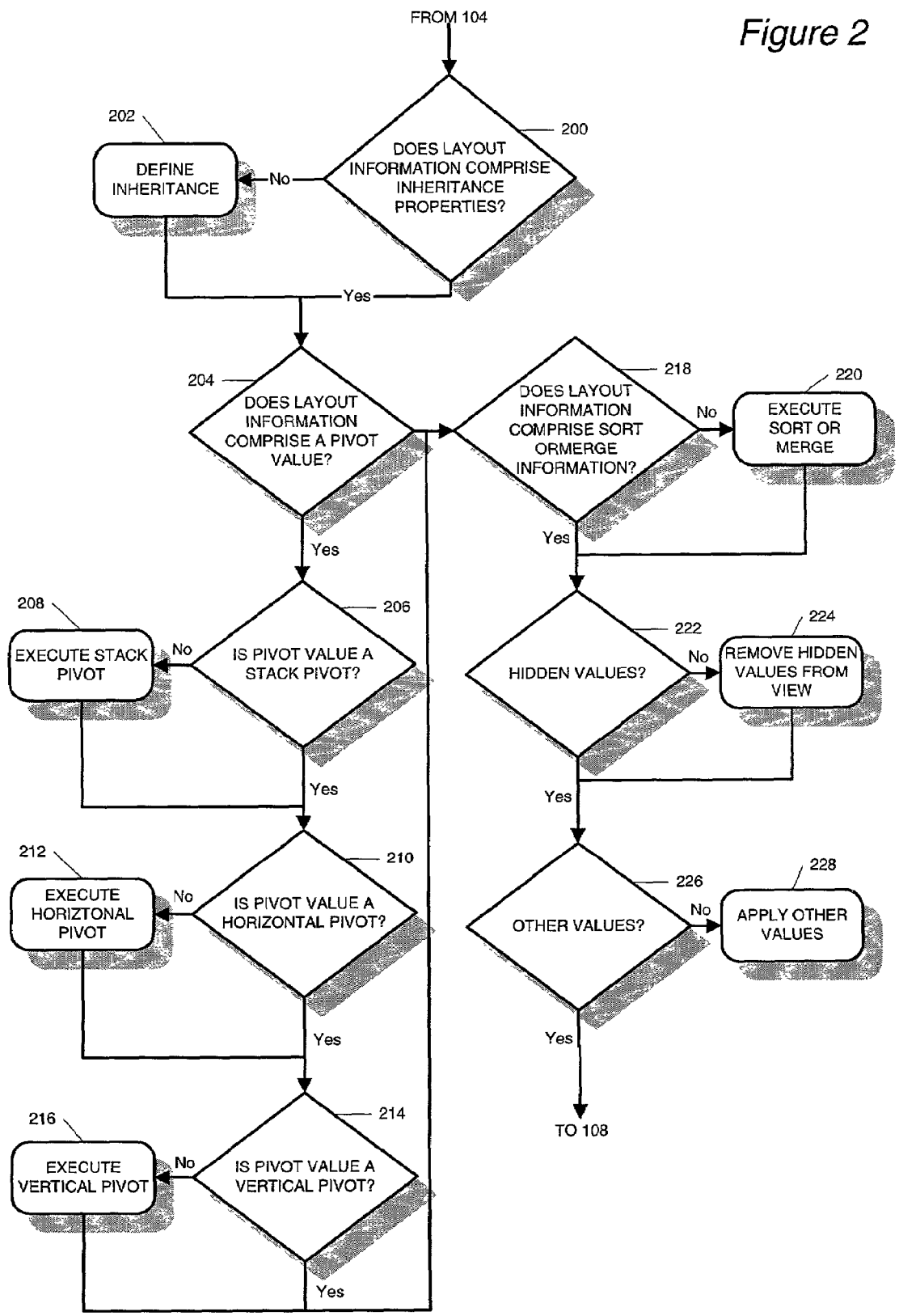
FIG. 2 illustrates specific types of layout information in accordance with one or more embodiments of the invention.

FIG. 2 illustrates specific types of layout information in accordance with one or more embodiments of the invention. For example, layout information may comprise inheritance properties, pivot values, hidden values, sorting information, merging information, and other information (e.g., steps 226 & 228) relating to the appearance of the table. Inheritance properties are typically supplied when the group of records represented in the table are arranged in a hierarchical structure (e.g., step 200). In such instances, inheritance properties can be defined on a node-by-node basis. Child nodes, for instance, may inherit from higher nodes in the hierarchy. When inheritance properties are supplied, systems embodying the invention take into account the inheritance properties when dynamically generating the preview table (e.g., step 202). As is the case with a family partitioning hierarchy, all nodes that are children of a parent node in the extended taxonomy inherit the layout structure defined for each node. The inherited structure can be overridden on a node-by-node basis so that different children of a category can have different pivoting, sorting, display sequence, and other pivot-specific sorting and display characteristics. Therefore, inheritance properties provide user with a mechanism for identifying on a node-by-node basis whether that node should inherit any properties.

If one or more pivot values are selected, pivot operations in accordance with the pivot values are executed (see e.g., steps 204–216). Any field and/or attribute associated with the group of records in the table can become a pivot value. When a particular field and/or attribute is identified as a pivot value that value is used during the pivot operation. For example, if a stack pivot value is identified, a stack pivot operation is executed (e.g., steps 206, 208). When a horizontal pivot value (e.g., step 210) or a vertical pivot value (e.g., step 214) is selected, a horizontal pivot (e.g., step 212) or vertical pivot (e.g., step 214) operation executes. Layout information in accordance with systems embodying the invention may also comprise sorting information and merging information. The sorting information identifies the order of sequence of records to be shown in the preview table. Merging information directs the system to combined records having identical values. For instance, if a plurality of records in a column contain the value "1 inch", the cells in the column can be merged into a single column.

The following table illustrates a merging operation:

| Brush Size | Brush Types | Price |
|---|---|---|
| 1 inch | Sponge brush | $10.00 |
| 1 inch | Paint brush | $7.00 |

May become:

| Brush Size | Brush Types | Price |
|---|---|---|
| 1 inch | Sponge brush | $10.00 |
|  | Paint brush | $7.00 |

The system also provides a mechanism for identifying hidden values. A value that is hidden may be used to perform an operation, but is not shown in the preview table output. User may elect to have individual values, fields, attributes, columns or rows hidden.

System Interface/Functionality:

Systems embodying the invention may contain a graphical user interface that enables users to generate and dynamically modify the preview table in real-time. Thus, the graphical user interface offers users a WYSIWYG system that automatically generates and displays previews of the tabular layout formats (e.g. preview tables) based on the layout specifications (e.g., layout information). This is accomplished without a report writer or any Hypertext Markup Language (HTML) coding. As FIG. 3 illustrates, graphical user interface 301 comprises layout portion (300) where the records of a table to be manipulated are displayed. Layout portion 300 contains the records of a table displayed in tabular form along with the participating fields and/or attributes. In some instances (e.g., when the user or system identifies certain fields or attributes as hidden fields), not all of the fields or attributes associated with the table are shown. The versions that are displayed may therefore have associated fields or attributes that are not visibly displayed, but that are part of the tabular data.

The reader should note that in some instances layout portion 300 contains family data, but the invention is not limited to the display of family data. Layout portion can contain any type of table data arranged in columns and rows. For instance, layout portion 300 may comprise any type of tabular data whether that data is related or unrelated to other records in the table. Thus, an embodiment of the invention does not require that the table data share a common value.

The user provides layout information utilized by the system to perform various formatting operations upon the tabular data shown in layout portion 300. The reader should note that systems embodying the invention do not require the tabular data shown in layout portion 300 be visible prior to performing manipulations on the data contain therein. Graphical user interface 301 comprises a location for defining layout detail (e.g., layout component 302). Layout information comprises any data or information that relates to changing the appearance or arrangement of tabular data. For example, layout information may comprise inheritance information, pivot values, hidden values, sorting information, merging information, or any other types of data relating to modifying the appearance of tabular data. Layout information may associate any value such as fields and/or attributes shown in list 304 with an operation (e.g., 306) to be performed. For instance, the user may associated one or more field and/or attribute from the tabular data with a pivot operation (e.g., stack pivot, horizontal pivot, or vertical pivot).

In particular, the layout information may identify: (a) the fields and/or attributes on which to pivot the resulting sub-tables of records, reducing redundant information in each of the sub-tables; (b) the fields and/or attributes by which to sort the records in each sub-table; (c) the fields and/or attributes that should not be displayed in the published output; (d) the display sequence of the fields and /or attributes that have not been hidden nor used to pivot; and (e) pivot-specific sorting and display information to be applied on a pivot-by-pivot basis. This layout specification is performed and stored in accordance with one embodiment of the invention on a family-by-family basis so that not only fields but also category-specific attributes can be used to define the pivoting, sorting, display sequence, and other pivot-specific sorting and display characteristics for each family. Multiple pivots of the same type can be nested, while pivots of differing types can be combined. In one embodiment of the invention, the taxonomy structure of the underlying data is extended for each family to include such layout specifications.

Dynamic Real-Time Previews:

As the layout information is obtained, the system automatically applies the layout information to the tabular data thereby updating the tabular data shown in layout portion 300 in real time. The updated table (which may be referred to as a preview table) provides the user with instantaneous interactive feedback as to the effects of the layout information. The user may obtain further feedback by iteratively revising the layout information and allowing the system to dynamically adjust the preview to account for the modified layout information. Thus, embodiments of the invention provide a mechanism for obtaining layout information that relates to a set of tabular data and instantaneously generating a corresponding preview in real time, thereby providing instant interactive feedback to the user. The user may continue to iteratively refine the layout information by tweaking and fine-tuning that information until the appearance of the preview table is satisfactory.

Layout Storage:

In one embodiment of the invention, the layout information (e.g., structure/formatting data) is stored independent from the tabular data itself and/or the partitioning hierarchy that further extends upon the underlying taxonomy structure. Thus, the user may apply the layout information to different sets of tabular data without having to redefine the layout of that data. Storing the layout information independent of the data also allows the system to flexibly modify the appearance of the data without changing the underlying relationships or integrity of the data from which the tabular data is derived. If, for example, the tabular data is obtained from a database, the referential integrity of the database need not be altered even though the appearance of the data is modified. When a partitioning hierarchy is utilized to define the tabular data to be manipulated, the hierarchy is not altered even though the layout of the tabular data is changed.

Storing layout information in this manner results in a system in which a report writer (or HTML) requires no complex code for pivoting tabular layout formats, no special coding for each category or family, and no intelligence about the underlying data. Instead, everything is driven by the extended taxonomy structure, and changes that occur in the taxonomy as well as the underlying records themselves can be immediately reflected in the output. In effect, the intelligence about how to layout and format the records in each family are built into the taxonomy itself rather than into special category- and family-specific programming code in the report writer. The reader should note that layout information may also be stored in a way that is directly associated with the tabular data to which it relates. In this instance, the tabular data and the layout information can be part of the same file or in separate files that are related to one another.

Pivot Operations:

FIG. 4 illustrates a table of data 400 (e.g., family data) before the execution of any pivot operations. The available fields and/or attributes 402 are shown, as are the various layout operations 404 that can be performed on the data. Inheritance properties 408 are also shown. When the table contains family data, the family hierarchy showing the category and the value upon which a partition was made may be shown. The reader should note, however, that aspects of the invention are applicable to the manipulation of any type of tabular data and that the invention is not limited to formatting family data, but provides a mechanism for dynamically formatting any type of table data in real-time.

Figure 5:
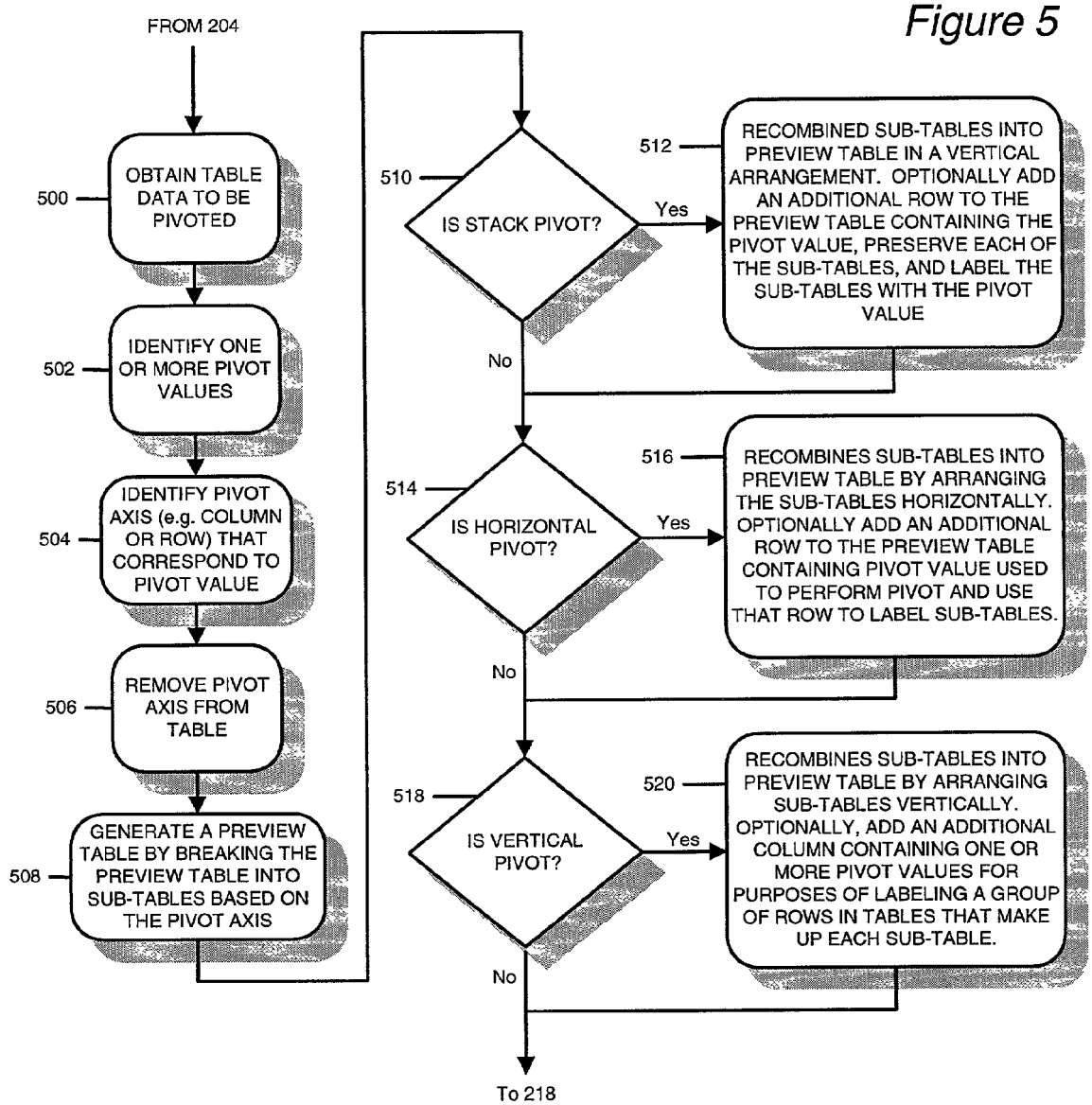
FIG. 5 is a flow charts that illustrates the functions executed when a stack pivot, horizontal pivot, or vertical pivot is requested in accordance with an embodiment of the invention.

FIG. 5 illustrates the functions executed when a stack pivot, horizontal pivot, or vertical pivot is requested. When the system performs a pivot operation, the values utilized for each pivot operation are typically obtained from the tabular data to be manipulated (see e.g., FIG. 5, step 500 and tabular data 300). The purpose of each pivot operation is to reduce the amount of redundant information that ultimately ends up in the preview table. The user may elect to hide the pivot values so that the information relating to such values is not shown in the preview table. Although there are several types of pivot operations, generally speaking a pivot operation is performed by identifying a pivot axis (e.g., a column or row) in a table that corresponds to the identified pivot value (e.g., steps 502 and 504). The pivot axis is then removed from the table (e.g., step 506) and the system generates a preview table by breaking the preview table to sub-tables based on the pivot axis (e.g., step 508). The group of records in the table may then be sorted into sub-tables based on the pivot value of the pivot axis.

Figure 6:
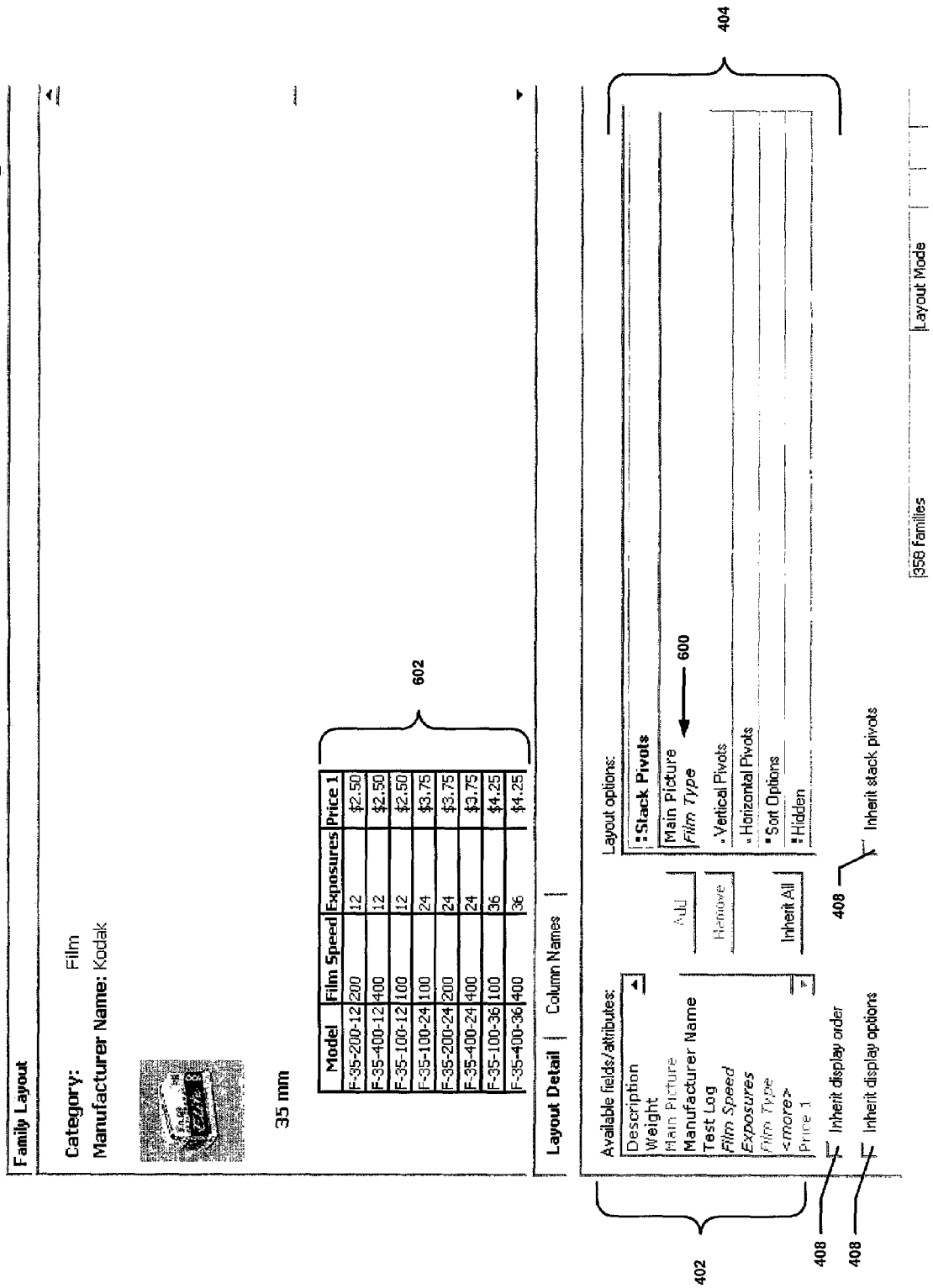
FIG. 6 illustrates a tabular data set in accordance with an embodiment of the invention after a stack pivot is performed in accordance with an embodiment of the invention.
Figure 7:
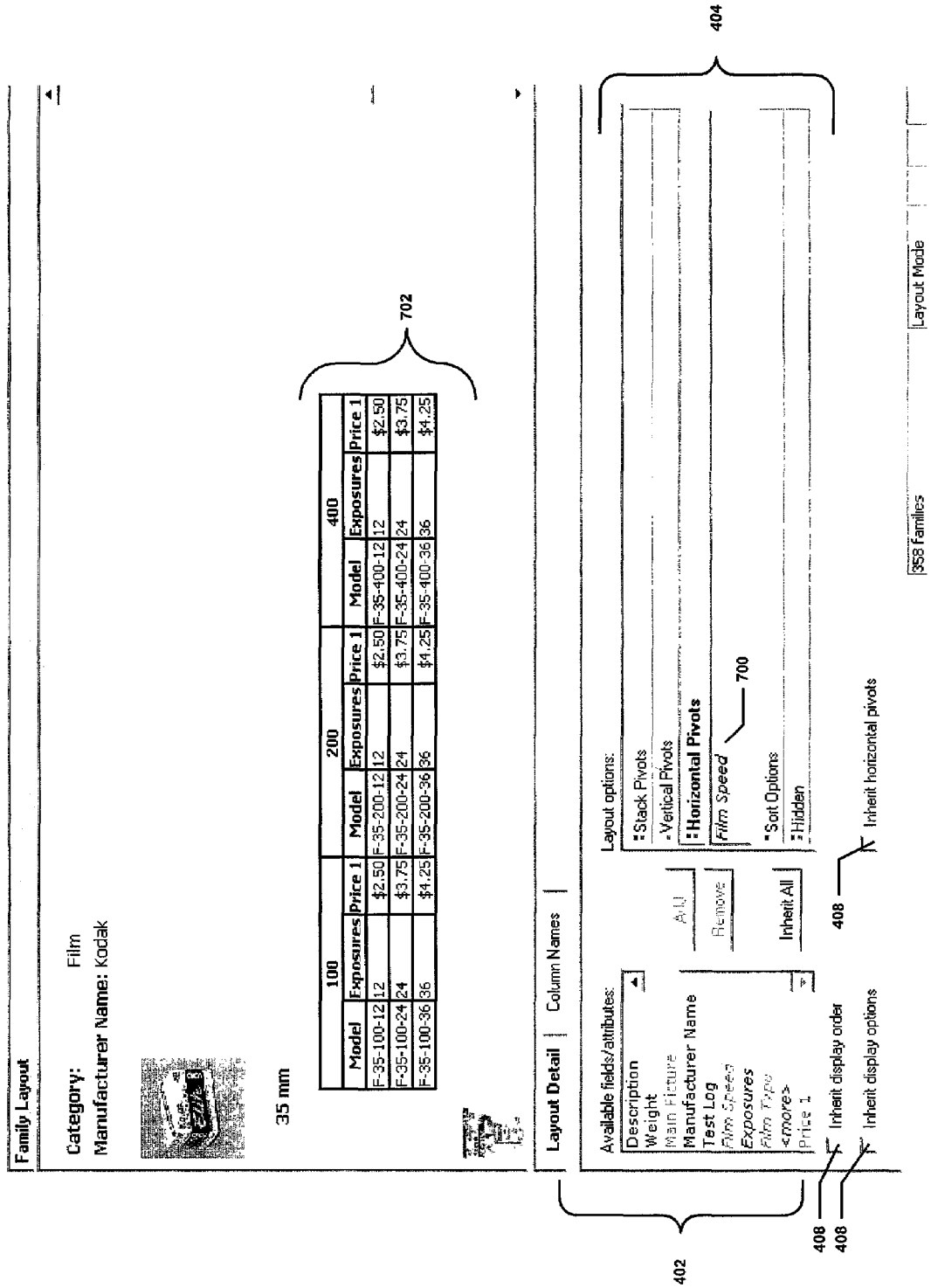
FIG. 7 illustrates a tabular data set after a stack pivot and horizontal pivot is performed in accordance with an embodiment of the invention.
Figure 8:
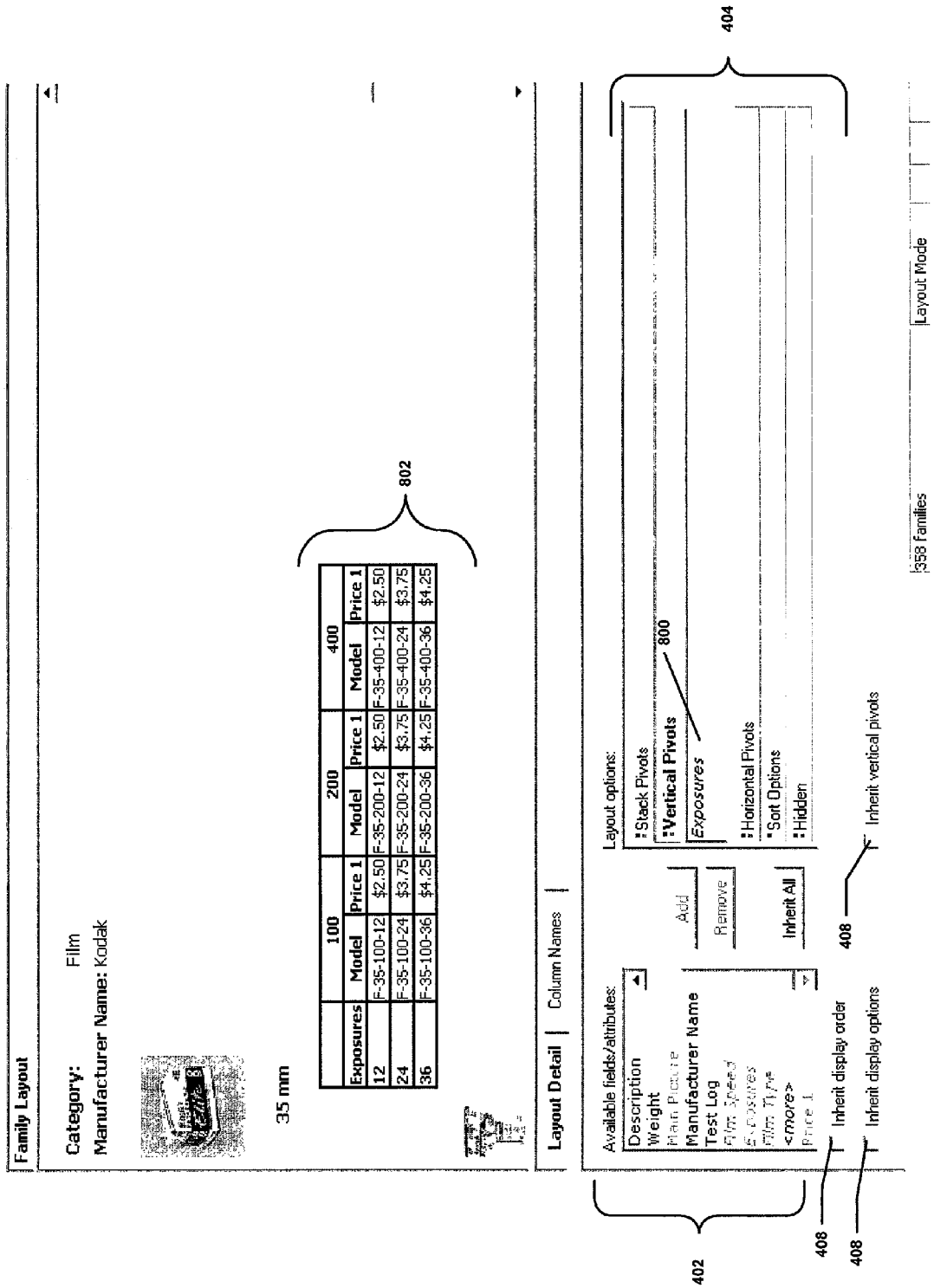
FIG. 8 illustrates a tabular data set after a stack pivot, horizontal pivot, and vertical pivot is performed in accordance with an embodiment of the invention.

FIGS. 6–8 illustrate a few specific examples of preview table as different types of pivot operations are dynamically applied to the tabular data.

A) Stack Pivot

One type of pivot operation is referred to as a stack pivot (e.g., step 510). The stack pivot recombines the sub-tables into the preview table in a vertical arrangement. Optionally, the system may add an additional row to the preview table that contains the pivot value, preserve each of the sub-tables, and label the sub-tables with at least one pivot value (e.g., step 512). Each pivot operation can be nested within another pivot operation. Thus, multiple pivots can be performed. An additional stack pivot, for example, could be nested within the initial stack pivot.

FIG. 6 illustrates the table shown in FIG. 4 after a stack pivot is performed. In this example, the user selected the fields/attributes of "main picture" and "film type" as pivot values 600. Upon selection of those values the system automatically applies a stack pivot operation against table 400 thereby transforming the table into preview table 602. Thus, preview table 602 now contains values representative of film, made by Kodak™, and separated by film type.

B) Horizontal Pivot

An additional type of pivot operation is referred to as a horizontal pivot (e.g., step 514). The horizontal pivot recombines the sub-tables into the preview table by arranging the sub-tables horizontally. The system may also add an additional row to the preview table that contains the pivot value used to perform the pivot and use that row to label the sub-tables (e.g., step 516). Multiple horizontal pivots can be performed and such pivots can be combined with other pivot operations. For instance, the system may perform a stack pivot and horizontal pivot on the same data. Horizontal pivots can also be nested within other horizontal pivots.

FIG. 7 illustrates the table shown in FIG. 6 after a subsequent horizontal pivot is performed using "film speed" as the horizontal pivot value 700. The horizontal pivot is applied to preview table 602 in real-time upon selection of the horizontal pivot value thereby automatically transforming preview table 602 into preview table 702. Preview table 702 now shows the different film types separated by film speed.

C) Vertical Pivot

A vertical pivot recombines the sub-tables into the preview table by arranging the sub-tables vertically (e.g., steps 518 and 520). Optionally, the system may add an additional column containing one or more pivot values for purposes of labeling a group of rows in the tables that make up each sub-table.

FIG. 8 illustrates FIG. 7 after a vertical pivot operation is executed. The pivot value utilized to minimize the redundancy in preview table 702 is vertical pivot value 800. Using "exposures" as the vertical pivot value. Upon identification of "exposures" as the field to use for the vertical pivot operation, the system in accordance with one or more embodiments of the invention transforms preview table 702 into preview table 802. Preview table 802 conveys the same information originally shown in table 400 but has minimized the amount of redundant or irrelevant information in the table. Once the table is manipulated to the point where the user is satisfied with the appearance of the table it can be optionally output to another computer program or provided to a publication mode.

FIG. 9 is a generalization of several pivot operations in accordance with an embodiment of the invention. Block 900 illustrates a stack pivot, block 902 illustrates a vertical (row) pivot), and block 904 illustrates a horizontal (column) pivot.

Publication:

When the appearance of the table is finalized, the layout information is saved. A table generated using that layout information may be provided to a publication program for further processing. The layout information may be applied against multiple sets of data and revised using the process described herein.

Section A

General Terminology

Database
- A database is a logical collection of interrelated information, managed and stored as a unit.
- A record is a representation of a real-world object such as a person, a product, or a company. A record consists of one or more individual data elements.
- A field describes one of the data elements of a record and is common to all the records in a table.
- A table is a simple, rectangular, row/column arrangement of related data values.
- Each horizontal row in the table represents a single record and consists of the same set of fields.
- Each vertical column of the table represents one field that is stored for each row in the table.
- A cell is the intersection of a row and a column in a table and contains the data value for a particular field of a particular record.
- A relational database is a database in which all data is organized into tables that may be related by matching columns.
- A relational database management system (RDBMS) is a software system that stores and retrieves data in a relational database.
- A lookup uses a pair of matching columns from two tables, taking the value of the column for a single record in the first primary table to "look up" additional information in a single corresponding record in the second lookup table.
- A join combines information from two tables by performing a lookup on every record of the primary table.
- Value limiting on a lookup table reduces the set of lookup values by eliminating from the set of all possible lookup values those values that do not correspond to any records in the primary table.

Hierarchy
- A hierarchy is a table in which the records have parent/child relationships.
- A node is another term for a record in a hierarchy.
- The root node of a hierarchy is a node that has no parent.
- An internal node of a hierarchy is a node that has at least one child.
- A leaf node of a hierarchy is a node that has no children.

Attributes
- An attribute is a data element that is not common to all the records in a table.
- A category is a subset of the records of a table that has a set of common attributes. Each record in a table must belong to exactly one category.
- A taxonomy is the partitioning of a table and its records into multiple categories, with or without hierarchy, along with the assignment of attributes to each of the categories.

Families and Pivots
- A family is a group of records in a table which are related by one or more common fields and/or attributes that have the same value, and which may also have additional fields of common information, such as an image, a logo, a paragraph of descriptive text, bullets of specifications, and so on.
- A presentation is a formatted family layout consisting of both the common information and the tabular information for the group of related family records.
- A partition is the division of a group of records into one or more subgroups, each of which is defined by the set of records from that group that have a fixed set of values for one or more fields and/or attributes. The partition is specified by the set of fields and/or attributes whose values or value combinations will define the subgroups.
- The partitioning table is the main table of records that is to be divided into partitions.
- A partitioning hierarchy of a partitioning table is a hierarchy in which the nodes of the hierarchy represent partitions of the partitioning table.
- A partitioning node is a node in the partitioning hierarchy that corresponds to a particular family of records. Since a partition simply divides a group of records into sub-groups, the set of records represented by a partitioning node is exactly the set of records represented by combining the sets of records represented by each of the descendants of that partitioning node. The root partitioning node (or root partition) represents the entire set of records of the partitioning table; each sub-node represents only those records which have the fixed set of field and/or attribute values defined by the partitions starting at that sub-node and tracing ancestors back up to the root; the entire set of leaf partitioning nodes (or leaf partitions) represents the entire set of records; and each record of the partitioning table belongs to one and only one leaf partitioning node.
- A base family is a family that corresponds to a leaf partitioning node.
- The base family set is the complete set of base families that corresponds to the complete set of leaf partitions in a partitioning hierarchy. The base family set is useful because each record of the partitioning table belongs to exactly one base family.
- A pivot reduces redundant information in a table of records by restructuring the table using one or more pivot columns. Specifically, it eliminates the pivot columns from the table, sorts and groups the records into multiple sub-tables based on the value or value combinations of these columns, and then labels each sub-table with these pivot values. Pivots are similar to partitions in that they divide a group of records into sub-groups. However, the sub-groups created by a partition are families, while the sub-groups created by pivots are used to control the layout of a particular family. Specifically, there are three types of pivots, each of which controls the layout of a family by affecting the arrangement of the resulting sub-tables and the corresponding placement of the pivot values.
- A stack pivot (or depth pivot) recombines each of the resulting sub-tables into a single table by arranging them vertically on top of each other, and adds an additional row containing the pivot values before each sub-table. Alternatively, each of the resulting sub-tables can be preserved, and each simply labeled with the pivot values.
- A row pivot (or vertical pivot) recombines each of the resulting sub-tables into a single table by arranging them vertically on top of each other, and adds an additional column containing the pivot values to label the group of rows comprising each sub-table.
- A column pivot (or horizontal pivot) recombines each of the resulting sub-tables into a single table by arranging them horizontally side-by-side, and adds an additional row containing the pivot values to label the set of columns comprising each sub-table. Multiple pivots of the same type can be nested, while pivots of differing types can be combined.

Structure for Efficient Storage of Families and for Automatically Placing Records into Them Problem Statement When publishing the contents of a catalog, records often need to be organized into a more granular structure than that provided by the categories of the taxonomy. Moreover, this granularity often involves grouping records based on not only the category value but also other criteria (e.g. manufacturer). Families provide a way of identifying these groupings by fixing one or more field and/or attribute values. However, several problems exist in defining structures to efficiently store and retrieve these families of records. First, it must be possible to find all the records that belong to a particular family, so that when a family is published, the records belonging to that family can be easily identified. Second, a record should belong to only one base family so that there is a direct mapping from records to base families. This enables similar products to be easily found. Third, as new records are added to the partitioning table, they must be assigned to the proper base family. Finally, some or all of the records of a given family may need to be reassigned to a different family if they no longer have the criteria which define that family because the records are modified or the definition for the family is changed.

For illustration purposes herein, a taxonomy is used wherein a table and its records may be partitioned into categories, with or without a hierarchy, where each category comprises a set of common attributes. A category's attributes may not be not physically part of a record, the attributes are considered part of a definition of the record where the record contains a reference to the category. Examples will be based on the allowing taxonomy and data:

| Category ID | Category | Parent ID | Position |
|---|---|---|---|
| | | | g |
| 1 | Printers | 0 | 0 |
| 2 | Daisy Wheel Printers | 1 | 0 |
| 3 | Dot Matrix Printers | 1 | 1 |
| 4 | Inkjet Printers | 1 | 2 |
| 5 | Laser Printers | 1 | 3 |

| Attribute ID | Attribute | Type |
|---|---|---|
| 1 | Pages Per Minute (ppm) | Numeric |
| 2 | Color | Text |

| Attribute ID | Feature ID | Feature |
|---|---|---|
| 2 | 1 | Color |
| 2 | 2 | Black & White |

| Category ID | Attribute ID |
|---|---|
| 1 | 1 |
| 1 | 2 |

| ID | Model | Manufacturer | Category ID | Description | Price |
|---|---|---|---|---|---|
| 1 | ALP1 | Acme | 5 | 8 pages per minute; black & white | $500 |
| 2 | AIJP1 | Acme | 4 | 3 pages per minute ink; black & white | $150 |
| 3 | ALP2 | Acme | 5 | 8 pages per minute; color | $4000 |
| 4 | ADMP1 | Acme | 3 | 3 pages per minute; black & white | $100 |
| 5 | BLPI | Best | 5 | 20 pages per minute; color | $5000 |
| 6 | BLP2 | Best | 5 | 20 pages per minute; black & white | $1000 |
| 7 | BIJ1 | Best | 4 | 4 pages per minute; color | $250 |
| 8 | BDWP1 | Best | 2 | 2 pages per minute; black & white | $75 |

The first four tables to the left define the followin taxonomy:
Printers (ppm, color)
Daisy Wheel Printers
Dot Matrix Printers
Inkjet Printers
Laser Printers
The taxonomy provides an example of a category hierarchy with five categories, the root category being "Printers" and the remaining categories being child (and leaf node) categories of the "Printers"category.

The fist table, or category table, defines categories within the taxonomy. The category table includes a "Parent ID" field that may be used to define a hierarchy and more particularly, a category's level within a category hierarchy. The "Position" field identifies a position within a hierarchical level for a given category. Each of the records in a uniform fields table (i.e., the fifth table) references a category record in the category table that defines additional data elements (or attributes) of the referencing record. An attributes table (i.e., just below the category table) defines attributes that may be included in a category. The third table, a featurevalues table may be used to define enumerated values of an attribute of the attributes table. In the example, the featurevalues table identifies two enumerated values for the "color" attribute. The fourth table, or category attribute table, identifies the attributes that are associated with a record of the category table. Inheritance may be used to allow child categories to inherit attributes that are associated with a parent category.

The families in the examples will be defined by the combination of manufacturer and category.

Known Solutions and Their Shortcomings the "table Per Family" Approach

The "table per family" approach partitions the records into families by storing the records of each family in its own table.

| ID | Model | Manufacturer | Category ID | Description | Price |
|---|---|---|---|---|---|
| 1 | ALP1 | Acme | 5 | 8 pages per minute; black & white | $500 |
| 3 | ALP2 | Acme | 5 | 8 pages per minute; color | $4000 |
| 2 | AIJP1 | Acme | 4 | 3 pages per minute ink; black & white | $150 |
| 4 | ADMP1 | Acme | 3 | 3 pages per minute; black & white | $100 |
| 5 | BLP1 | Best | 5 | 20 pages per minute; color | $5000 |
| 6 | BLP2 | Best | 5 | 20 pages per minute; black & white | $1000 |
| 7 | BIJ1 | Best | 4 | 4 pages per minute; color | $250 |
| 8 | BDWP1 | Best | 2 | 2 pages per minute; black & white | $75 |

This approach provides for efficient storage of the data. However, as the number of families increases, so does the number of tables. Data management and searching for records then become increasingly complex and time-consuming because they require that many tables be accessed.

Changes to the family definition require complex restructuring of the tables and reorganization of the records contained within them. For example, if the families were changed to be defined as the combination of the category and color attribute, then six new tables (Laser/Color, Laser/B&W, Inkjet/Color, Inkjet/B&W, Dot Matrix/B&W, and Daisy Wheel/B&W) would need to be created and populated, and the old tables would need to be destroyed.

The "Table Lookup" Approach

The "table lookup" approach requires three steps. First, a table containing a record for each of the families must be created. Second, a lookup field for the family must be added to the partitioning table. Third, the id of the proper family record in the family table must be placed into this field for each record of the partitioning table to create the relationship between records and their corresponding family.

| Family ID | Description |
|---|---|
| 1 | Acme Laser Printers |
| 2 | Acme Inkjet Printers |
| 3 | Acme Dot Matrix Printers |
| 4 | Best Laser Printers |
| 5 | Best Inkjet Printers |
| 6 | Best Daisy Wheel Printers |

| ID | Model | Manufacturer | Category ID | Description | Price | Family ID |
|---|---|---|---|---|---|---|
| 1 | ALP1 | Acme | 5 | 8 pages per minute; black & white | $500 | 1 |
| 2 | AIJP1 | Acme | 4 | 3 pages per minute ink; black & white | $150 | 2 |
| 3 | ALP2 | Acme | 5 | 8 pages per minute; color | $4000 | 1 |
| 4 | ADMP1 | Acme | 3 | 3 pages per minute; black & white | $100 | 3 |
| 5 | BLP1 | Best | 5 | 20 pages per minute; color | $5000 | 4 |
| 6 | BLP2 | Best | 5 | 20 pages per minute; black & white | $1000 | 4 |
| 7 | BIJ1 | Best | 4 | 4 pages per minute; color | $250 | 5 |
| 8 | BDWP1 | Best | 2 | 2 pages per minute; black & white | $75 | 6 |

This approach has several major drawbacks. First, the manual process of assigning the family ids is time-consuming, error-prone and extremely tedious. Second, changes to the record do not result in the product being properly reassigned to the correct family. Third, changes to the families may require that some or all of the records of the family be assigned.

Alternative Solutions and Their Shortcomings

The "Taxonomy" Approach

Under this approach, the taxonomy (as defined in A2i's previous patent application) itself is extended in so that each family will become a leaf node in the taxonomy by building the fixed values for the fields and/or attributes defining the family into the category structure of the taxonomy.

| Category ID | Category | Parent ID | Position |
|---|---|---|---|
| 1 | Acme | 0 | 0 |
| 2 | Acme Printers | 1 | 0 |
| 3 | Acme Dot Matrix Printers | 1 | 1 |
| 4 | Acme Inkjet Printers | 1 | 2 |
| 5 | Acme Laser Printers | 1 | 3 |
| 6 | Best | 0 | 1 |
| 7 | Best Printers | 6 | 0 |
| 8 | Best Daisy Wheel Printers | 6 | 1 |
| 9 | Best Inkjet Printers | 6 | 2 |
| 10 | Best Laser Printers | 6 | 3 |

-continued

| Attribute ID | Attribute | Type |
|---|---|---|
| 1 | Pages Per Minute (ppm) | Numeric |
| 2 | Color | Text |

| Attribute ID | Feature ID | Feature |
|---|---|---|
| 2 | 1 | Color |
| 2 | 2 | Black & White |

| Category ID | Attribute ID |
|---|---|
| 1 | 1 |
| 1 | 2 |

| ID | Model | Manufacturer | Category ID | Description | Price |
|---|---|---|---|---|---|
| 1 | ALP1 | Acme | 5 | 8 pages per minute; black & white | $500 |
| 2 | AIJP1 | Acme | 4 | 3 pages per minute ink; black & white | $150 |
| 3 | ALP2 | Acme | 5 | 8 pages per minute; color | $4000 |
| 4 | ADMP1 | Acme | 3 | 3 pages per minute; black & white | $100 |
| 5 | BLPI | Best | 10 | 20 pages per minute; color | $5000 |
| 6 | BLP2 | Best | 10 | 20 pages per minute; black & white | $1000 |
| 7 | BIJ1 | Best | 9 | 4 pages per minute; color | $250 |
| 8 | BDWP1 | Best | 8 | 2 pages per minute; black & white | $75 |

The first four tables to the left define the following taxonomy:
Acme
Acme Printers (ppm, color)
Acme Dot Matrix Printers
Acme Inkjet Printers
Acme Laser Printers
Best
Best Printers (ppm, color)
Best Daisy Wheel Printers
Best Inkjet Printers
Best Laser Printers This has several shortcomings. First, the taxonomy structure will become polluted with information that has nothing to do with the original category- and attribute-based taxonomy. A single category of related database records will be broken into multiple categories, obscuring the actual relationship between the records and the original category. In this example the taxonomy is polluted with data about the manufacturers. Should new manufacturers be added or existing ones removed, then the taxonomy will require extensive changes.

Second, there is a tradeoff between searchability and data redundancy: preserving the fields and attributes used to extend the taxonomy maintains searchability but results in duplicate data; eliminating them to avoid data redundancy restricts searchability. In this example there is data redundancy, because the printer attributes now have to be linked to two nodes (Acme Printers and Best Printers) instead of only one node (Printers in the base example). Suppose a new attribute is needed such as interface type. In the base example, the new attribute needs only be linked to one node, but in this example, it needs to be linked to two nodes. With more data, there will tend to be more data redundancy. Modifications will require changes to be made in multiple places, each increasing the risk of error being introduced into the data. Maintaining the taxonomy becomes increasingly complex since it ends up being extended with so much additional detail. Data redundancy can be eliminated from the taxonomy by choosing not to include the redundant data, but this is generally not an acceptable solution as it severely restricts the set of search parameters.

Third, finding similar products becomes more difficult as they may no longer reside in the same category. For example, given product model ALP1, the category could have previously been looked up (Laser Printers), and a search could then be done on that category to find similar products. Using this approach, the category lookup will find only Acme Laser Printers, but not Best Laser Printers.

The "Stored Query" Approach

Because the related records in a family have the same fixed values for a set of fields and/or attributes, they can be identified by a query specifying these common values. This query can be stored and later referenced to identify and locate the records for the family.

| Query Name | Query |
|---|---|
| Acme Laser Printers | Manufacturer = Acme; Category = Laser Printers |
| Acme Inkjet Printers | Manufacturer = Acme; Category = Inkjet Printers |
| Acme Dot Matrix Printers | Manufacturer = Acme; Category = Dot Matrix Printers |

-continued

| Query Name | Query |
|---|---|
| Best Laser Printers | Manufacturer = Best; Category = Laser Printers |
| Best Inkjet Printers | Manufacturer = Best; Category = Inkjet Printers |
| Best Daisy Wheel Printers | Manufacturer = Best; Category = Daisy Wheel Printers |

This approach also has several shortcomings. First, there are a variety of problems setting up and maintaining the queries. Setting up the queries is time-consuming and error-prone, because each must be manually done. It requires that each query be given a name or id of some sort so that it can be referenced, and with a large number of families it quickly becomes difficult to organize and manage the set of family queries. There is no way to guarantee that the set of queries will contain the entire set of records, while also ensuring that each record belongs to exactly one query; that is, some queries may inadvertently overlap so that a single record belongs to multiple families, or the queries may not provide adequate coverage, so that some records may not belong to any family. The relationship between the families is not visually obvious from the queries, nor is there any single structure that identifies, illustrates, or maintains these relationships. Finally, while the queries identify which records belong to the family, they fail to provide an efficient way to determine to which family a particular record belongs. Finding the family for a particular record would require examining each of the queries, one at a time, to see if the record matched the criteria for that query.

Improved Solution

The improved solution takes advantage of the fact that each family is defined by fixing a set of common values for one or more fields and/or attributes. The base families are organized into a partitioning hierarchy by partitioning the complete set of base families according to the common values that define each of them. Since a category- and attribute-based taxonomy already exists, it would be beneficial to layer the partitioning hierarchy on top of it, so as to leverage the work already done to create the taxonomy. This simply requires using the category field to define the first partition in the partitioning hierarchy. At first this might appear to be the same as the Taxonomy approach presented above. The difference lies in the fact that the partitioning hierarchy is layered on top of the existing taxonomy, rather than incorporate the family information directly into the taxonomy. The partitioning hierarchy is stored as a hierarchical structure (as explained in A2i's previous patent application). An additional table is used to store the fixed field and/or attribute that define the partitions. The table contains the following fields: the id of the partitioning node, the field or attribute which is being partitioned, and positional information to allow for combining and nesting partitions. The reason that an additional table is required, as opposed to storing the partitioning information directly as part of the hierarchy table, is that there may be multiple fields and/or attribute that define a partition. For example, a partition could be defined based on the combination of a field (such as manufacturer) and an attribute (such color).

| Family ID | Family | Parent ID | Position |
|---|---|---|---|
| 1 | Printers | 0 | 0 |
| 2 | Daisy Wheel Printers | 1 | 0 |
| 3 | Best Daisy Wheel Printers | 2 | 0 |
| 4 | Dot Matrix Printers | 1 | 1 |
| 5 | Acme Dot Matrix Printers | 4 | 0 |
| 6 | Inkjet Printers | 1 | 2 |
| 7 | Acme Inkjet Printers | 6 | 0 |
| 8 | Best Inkjet Printers | 6 | 1 |
| 9 | Laser Printers | 1 | 3 |
| 10 | Acme Laser Printers | 9 | 0 |
| 11 | Best Laser Printers | 9 | 1 |

| Family ID | Field |
|---|---|
| 1 | Manufacturer |

The first table to the left defines the following family partitioning hierarchy:
Printers (ppm, color)
Daisy Wheel Printers
Best Daisy Wheel Printers
Dot Matrix Printers
Acme Dot Matrix Printers
Inkjet Printers
Acme Inkjet Printers
Best Inkjet Printers
Laser Printers
Acme Laser Printers
Best Laser Printers Notice that the family partitioning hierarchy has the same initial structure of the taxonomy, but additional nodes are added to it. These nodes are created because a partitioning exists at the Printers node that is defined to partition by manufacturer. This causes all leaf nodes under this node to be further partitioned by manufacturer. The initial leaf nodes were Daisy Wheel Printers, Dot Matrix Printers, Inkjet Printers, and laser Printers. Under each of these, additional nodes will be added for each manufacturer that has products defined by the query constructed by taking all the criteria defined by the ancestor nodes in the family partitioning hierarchy. Since this is the first partition, the criteria are simply the category for each of the initial leaf nodes. Notice that a node is not added for all manufacturers, only those that correspond to actual records in the database.

One important constraint on this approach is that whenever a new category is added or removed to the taxonomy, the corresponding portion of the family partitioning hierarchy must also be adjusted in the same manner. This will result in a change of base families.

This idea can be extended to reflect changes in the possible values for other fields and attributes in the family partitioning hierarchy. Thus, when a value is added/removed from the set of possible values for a particular partition, the corresponding node will be added/removed from the family partitioning hierarchy. This is illustrated below where in addition to partitioning on the category (the initial taxonomy) and manufacturer (the additional nodes added to account for the manufacturer), a partition by Color is also performed on the Laser Printers node.

| Family ID | Family | Parent ID | Position |
|---|---|---|---|
| 1 | Printers | 0 | 0 |
| 2 | Daisy Wheel Printers | 1 | 0 |
| 3 | Best Daisy Wheel Printers | 2 | 0 |
| 4 | Dot Matrix Printers | 1 | 1 |
| 5 | Acme Dot Matrix Printers | 4 | 0 |
| 6 | Inkjet Printers | 1 | 2 |
| 7 | Acme Inkjet Printers | 6 | 0 |
| 8 | Best Inkjet Printers | 6 | 1 |
| 9 | Laser Printers | 1 | 3 |
| 10 | Acme Laser Printers | 9 | 0 |
| 11 | Best Laser Printers | 9 | 1 |
| 12 | Color Acme Laser Printers | 10 | 0 |
| 13 | B&W Acme Laser Printers | 10 | 1 |
| 14 | Color Best Laser Printers | 11 | 0 |
| 15 | B&W Best Laser Printers | 11 | 1 |

| Family ID | Field |
|---|---|
| 1 | Manufacturer |
| 9 | Manufacturer |
| 9 | Color |

The first table to the left defines the following family partitioning hierarchy:
Printers
Daisy Wheel Printers
Best Daisy Wheel Printers
Dot Matrix Printers
Acme Dot Matrix Printers
Inkjet Printers
Acme Inkjet Printers
Best Inkjet Printers
Laser Printers
Acme Laser Printers
Color Acme Laser Printers
B&W Acme Laser Printers
Best Laser Printers
Color Best Laser Printers
B&W Best Laser Printers Notice that partitioning information for Color has been added to the Laser printers node, and that only descendants of that node are affected. Also notice that a second occurrence of a manufacturer partition has been added. The reason for this is that descendant nodes inherit partition information. In other words, all descendant nodes of a particular "ancestor" node are automatically assigned the same partition information that is assigned to the ancestor, which makes setting up and maintaining partitions much more efficient. However, if there were no way to override the partition settings of an ancestor node, inheritance would always affect all descendant nodes. To get around this problem, inheritance does not affect a node that has any partitions defined nor does it affect any of its descendants; rather the descendants inherit the override partition settings. In order to get the partition defined for an ancestor as well as a custom partition, a node must define both partitions. If the second occurrence of the manufacturer partition had not been added, then the family partitioning hierarchy would be as follows.

| Family ID | Family | Parent ID | Position |
|---|---|---|---|
| 1 | Printers | 0 | 0 |
| 2 | Daisy Wheel Printers | 1 | 0 |
| 3 | Best Daisy Wheel Printers | 2 | 0 |
| 4 | Dot Matrix Printers | 1 | 1 |
| 5 | Acme Dot Matrix Printers | 4 | 0 |
| 6 | Inkjet Printers | 1 | 2 |
| 7 | Acme Inkjet Printers | 6 | 0 |
| 8 | Best Inkjet Printers | 6 | 1 |
| 9 | Laser Printers | 1 | 3 |
| 10 | Color Laser Printers | 9 | 0 |
| 11 | B&W Laser Printers | 9 | 1 |

| Family ID | Field |
|---|---|
| 1 | Manufacturer |
| 9 | Color |

The first table to the left defines the following family partitioning hierarchy:
Printers
Daisy Wheel Printers
Best Daisy Wheel Printers
Dot Matrix Printers
Acme Dot Matrix Printers
Inkjet Printers
Acme Inkjet Printers
Best Inkjet Printers
Laser Printers
Color Laser Printers
B&W Laser Printers There is also a difference based on the ordering of the partitions. Had the Manufacturer Name partition been added after the Color partition, then the result would be as above with two nodes added under each of the Color Laser Printers and B&W Laser Printers nodes for the Acme and Best manufacturers.

Partitioning by multi-valued fields and attributes is given special treatment to ensure that a record belongs to exactly one family. The combination of values is treated as a distinct unit when determining the unique set of values for the field/attribute. For example, if there was a partition on a multi-valued field of color and one of the records had Blue/Green as the value for that field, then the record would be placed in the Blue/Green family, and not in the Blue family or Green family.

In order to find the records that belong to a particular family, a query can be constructed by setting constraints for each value from the fixed set of common values for that family. Executing that query will result in the set of records that belong to that family.

Since the partitioning hierarchy is organized so that each branch, from a node to its sub-nodes, differ in the value or value combination on which the node is partitioned, each of the leaf partitioning nodes will differ by at least one value or value combination.

Thus the queries constructed for each of the base families will also differ by at least one constraint. The result is that each query is guaranteed to return a non-overlapping set of records.

The linkage between families and records is accomplished automatically by constructing queries with the appropriate constraints for that family, as opposed to the manual process of linking each record to the proper family. This delivers the added benefits that when new records are added or existing records are modified, they will belong to the proper family automatically. Also, if the partitioning hierarchy is restructured so that family definitions change, each record of the partitioning table will automatically belong to its proper family.

Implementation and Method of Use
See the discussion on families in the section entitled Catalog Manager Data Format.
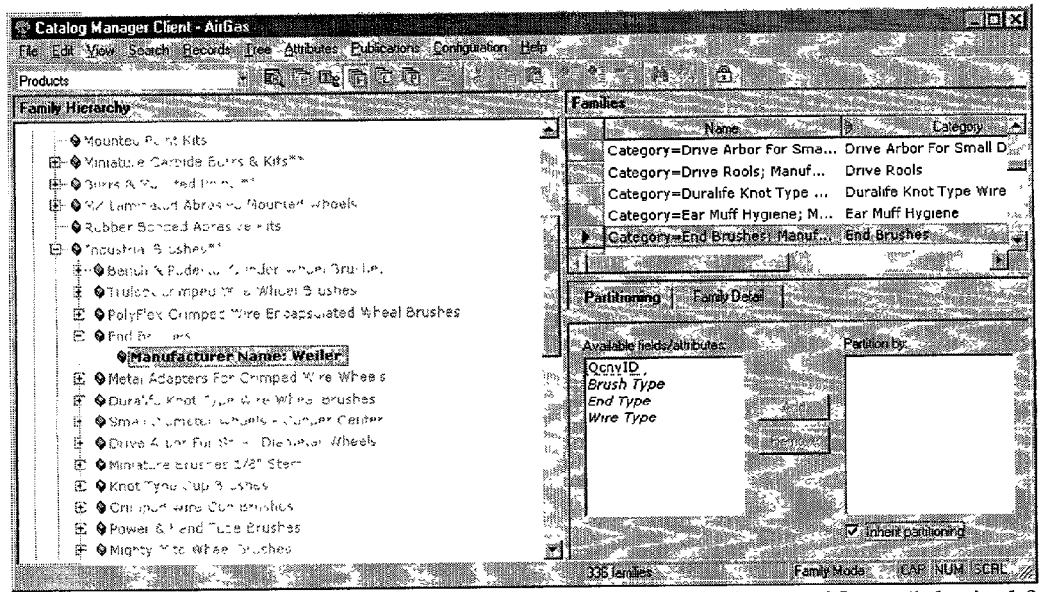
Example 1. The End Brushes category is partitioned by Manufacturer Name (inherited from ancestor node)
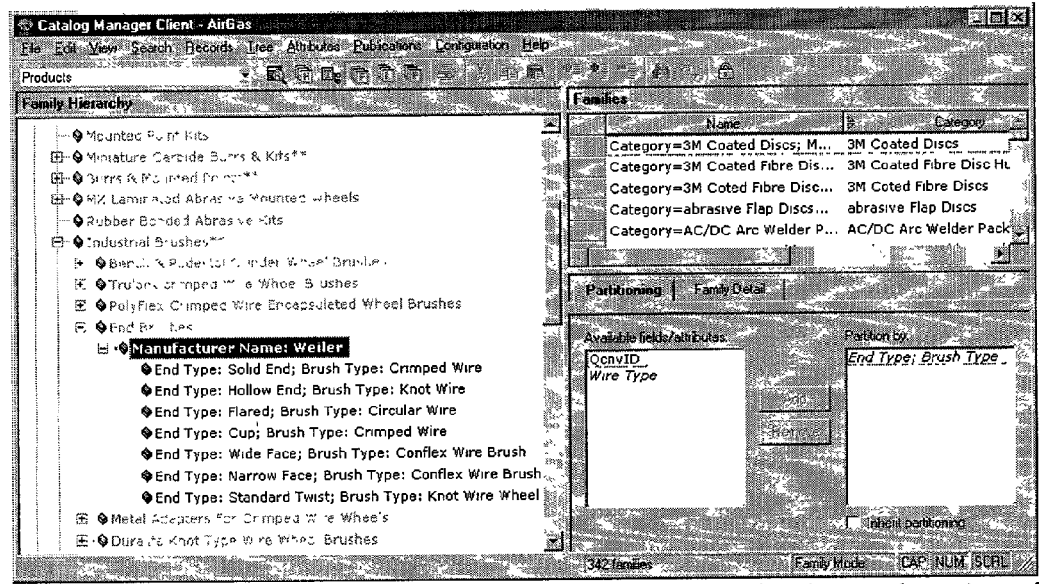
Example 2. A second partition is created which partitions by the combination of End Type and Brush Type The Innovations Among the innovations are: (a) support for families and the partitioning hierarchy; (b) an efficient storage for families which allows products to be found from families, and conversely, families to be found from products; (c) layering the partitioning hierarchy on top of a category- and attribute-based taxonomy to leverage the existing taxonomy; (d) a method for automatically creating new families as the set of actual field and attribute values is changed; (e) a method for ensuring that product records automatically belong to the proper family, even as new records are added and existing records are modified; (f) the ability to partition at any level in the partitioning hierarchy, so that different nodes within a single partition can be partitioned differently, and (g) the inheritance and overriding of inheritance of partition information in the partitioning hierarchy.

Method for Automatically Maintaining Product Families

Problem Statement

After the family partitioning hierarchy has been created, it must then be maintained when changes are made to the taxonomy structure or to the domain of fields and attributes used for partitioning. Changes to the taxonomy structure that require updates to the partitioning hierarchy include adding, removing, moving, or modifying a category. Changes to the domain of a partitioning field include adding, removing or modifying a field value, while changes to the feature domain for a partitioning attribute include adding, removing or modifying a feature value.

A second problem arises as a result of an optimization that avoids creating a family partitioning hierarchy that contains a high percentage of families with no records. In the previous section, we had assumed that the set of possible values and value combinations and the set of actual values and value combinations in existing main table records were identical. The optimization recognizes that this is not likely to be the case, and that in fact, the number of actual values and value combinations will be substantially less than the number of possible values and value combinations.

Note that using the set of possible values and value combinations when creating families, the partitioning hierarchy becomes unnecessarily large because it will contain many families that contain no records. To illustrate this point, consider a catalog with 200 categories, 500 manufacturers, and 10,000 products. If category were to be partitioned by manufacturer, the "cross-product" approach of using the possible value combinations would create 100,000 families in the partitioning hierarchy, even though the main table contains only 10,000 product records! Most of these families would in fact contain no records, since for a particular category, only a small subset of manufacturers offers products (and conversely, each manufacturer offers just a small number of categories of products).

By contrast, using only the set of actual value combinations that occur in the main table records reduces the number of families dramatically to precisely those containing records (and certainly no more than the number of products in the main table) and results in a much more compact partitioning hierarchy. A consequence of this optimization, however, is that the partitioning hierarchy must now be maintained not only across changes to the taxonomy structure and domains of partitioning fields and attributes, but also across changes to main table records. These changes include adding, removing, or modifying main table records.

The Solution

The solution is to automatically adjust the partitioning hierarchy when either the taxonomy structure, the domain of a partitioning field or attribute, or main table records are modified.

Since the partitioning hierarchy is layered on top of the taxonomy, changes to the structure of the taxonomy hierarchy require updates to the partitioning hierarchy. In particular, nodes that are added, removed, modified, or moved in the taxonomy must be similarly added, removed, modified, or moved in the partitioning hierarchy. In addition, many of the advanced features for in place schema and data manipulation such as splitting and merging attributes (discussed in the previous patent application) can also require updates to the partitioning hierarchy.

Since the partitioning hierarchy depends on the existence of values in actual product records, changes to the main table records may require updates to the partitioning hierarchy. When records are added to the main table, new families need to be created if the records contain a value not yet used in any of the fields and/or attributes that are used in defining the family partitions. Similarly, if a record is deleted from the main table and that record is the only record in the main table to contain a particular value for one of the family partitioning fields or attributes, the corresponding partitioning node needs to be removed. Modification of a main table record can have effects similar to those of adding a new record or deleting an existing one since a new value assigned to a field or record could be a value not yet used in one of the family partitioning fields/attributes and the value replaced could have been the only occurrence of a particular value in the family partitioning field/attribute. The merging of attribute values in the taxonomy has the same effect as modifying the main table records by replacing the original attribute values with the merged attribute value. As such it can similarly require updates to the partitioning hierarchy.

Note that updates to the partitioning hierarchy to reflect changes to the domain of a partitioning field or attribute are automatically handled through the handling of changes to the main table records. This is because changes to a domain no longer affect the partitioning hierarchy unless the added, removed or modified value is actually in use in the main table records.

Implementation and Method of Use

See the discussion on families in the section entitled Catalog Manager Data Format.

The Innovations

Among the innovations are: (a) support for automatically maintaining product families and the partitioning hierarchy; (b) creating partitioning nodes based on the actual set of values and value combinations used in main table records rather than the possible set of values and value combinations; (c) detecting when the partitioning hierarchy needs to be updated due to modifications of the taxonomy or main table records; and (d) automatically maintaining the partitioning hierarchy when such changes are detected.

Structure for Maintaining Common Information for Families

Problem Statement

Very often, a database must store fields of common information that relate to a family of related records rather than just a single record. The challenge is to do so in a way that is efficient to store, easy-to-implement for existing data, and easy-to-maintain as additional records are added to the database.

Known Solutions and Their Shortcomings

The "Single Table" Approach

The "single table" approach stores all of the data values for a main table record, including the common information that applies to an entire family of records, within the record itself in the single main table. As a result, the table structure is very simple, but at the same time, it is both wasteful of storage because the common data values are duplicated in multiple records, and wasteful of effort because each of the values must be entered manually and repetitively for each of the multiple records in a family. In addition, a change to any of the common data values is not automatically propagated to the entire family of records, rather; the data value must be updated in each of the multiple records that contain the value, introducing the potential for inconsistency and error.

The "Multi-Table" Approach

The "multi-table" approach is consistent with the relational data model and uses multiple tables to store related information. The primary table stores the specific information about each main table record while a lookup table contains a record for each family that stores the fields of common information. Records in the tables are linked by placing in both tables an id that links each record in the primary table to the corresponding record in the lookup table. The advantage of this approach is that the common data values are stored only once in a single record in the lookup table, eliminating duplication and saving space; additionally, changes to the single copy of the common information are automatically reflected for all the records of a family. The drawback of this approach is that the link between each record in the primary table and corresponding record in the lookup table still needs to be defined manually; similarly, new records that are added to the database must be manually linked to the common information by the user rather than automatically linked by the system. In addition, if there are many different fields of common information, but only some of them are used for each family, the columns that store the information will be sparse.

Improved Solution

The improved solution maintains all of the benefits of the multi-table approach but eliminates the need for a lookup field in the primary table whose value identifies the id of the corresponding record in the lookup table, and simultaneously, the need for the user to manually place the id of the lookup record into this lookup field in each primary table record. Instead, the improved solution layers on top of the family partitioning hierarchy in such a way that the system creates and maintains all of the relationships automatically based on the membership of each group of primary table records in each family in the family hierarchy.

After the partitions have been defined by the user and the family partitioning hierarchy generated by the system, the next step is for the user to assign the common information for each family to the families corresponding to leaf nodes of the family hierarchy. Under this scheme, records in the primary table have already been grouped together into families, common information is then easily assigned to each family, and each new record in the primary table is automatically linked to the correct common information by virtue of its membership in the proper family. Moreover, for efficiency in storage, rather than store the data values in a fixed set of fields that exist for every family record, the data values are stored in a related, secondary table only on an as-needed basis so that, like attributes, they only take up space if they exist.

Implementation and Method of Use

See the discussion on families in the section entitled Catalog Manager Data Format.

The Innovations

Among the innovations are: (a) linking common information to families; (b) linking common information to each family rather than to the main table records by utilizing the family partitioning hierarchy; and (b) automatically creating and maintaining all of the relationships between existing and new main table records and common information based on family membership.

Structure for Automatically Formatting and Publishing Database Data

Problem Statement

Publishing information stored in an RDBMS as properly formatted presentations consisting of common information and tabular information for each group of related family records is relatively straightforward provided that the tabular layout format is relatively simple and the field structure comprising the information is uniform across the entire set of records in the DBMS. However, a problem arises when the tabular layout formats are more sophisticated, when each category of information consists of different data elements, and/or when each family requires its own distinct tabular layout format. In these cases, laying out each individual family requires more sophisticated algorithms and each family requires its own special handling, dramatically increasing the complexity of the publishing task.

Known Solutions and Their Shortcomings

Most RDBMS include report writers that provide an adequate platform for publishing information stored in the database as formatted presentations with simple tabular layout formats. The report writer can be easily coded to combine information from records in multiple tables, format the common information associated with each family in a structured way, and finally sort the records of tabular information. This approach works well with a relational database in which the field structure and the set of fields is consistent across the entire set of records, the field definitions are relatively static, and the number of fields is limited; because each field applies across the entire database, special handling and formatting for a particular field or fields is coded only once rather than multiple times.

By contrast, in a database with category-specific attributes, the field structure and set of fields differs for the records of each category. Thus, the report writer needs to be coded with specific intelligence about how to handle attributes on a category-by-category basis. If there are a large number of categories and attributes, this can be extremely tedious, time-consuming, and error prone to implement. And once implemented, the report writer must then be recoded each time changes are made to the taxonomy structure and/or the set of attributes associated with each category, which makes the report writer approach difficult to maintain as the taxonomy changes over time.

Moreover, using existing report writers (or HTML) to present and structure tabular information more efficiently using pivot columns is a manual process that requires programming expertise that is beyond the capability of most average users. It is also data-dependent, so that even if the report writer can be used to create the pivot tables, the code then needs to be rewritten to reflect the data each time changes are made to the underlying records. Moreover, if each family requires a different tabular layout format because of category-specific attributes, then the particular tabular layout format for each family must be individually coded in the report writer, substantially increasing the coding complexity.

Improved Solution

The improved solution addresses and completely eliminates these coding challenges. It further extends the taxonomy structure to include not only the family partitioning hierarchy information but also to define additional layout information about the structure and formatting of each presentation of family records. In particular, the taxonomy structure is extended for each family to include layout specifications that identify: (a) the fields and attributes on which to pivot the resulting sub-tables of records, reducing redundant information in each of the sub-tables; (b) the fields and attributes by which to sort the records in each sub-table; (c) the fields and attributes that should not be displayed in the published output; (d) the display sequence of the fields and attributes that have not been hidden nor used to pivot; and (e) pivot-specific sorting and display information to be applied on a pivot-by-pivot basis. This layout specification is performed and stored on a family-by-family basis so that not only fields but also category-specific attributes can be used to define the pivoting, sorting, display sequence, and other pivot-specific sorting and display characteristics for each family. Multiple pivots of the same type can be nested, while pivots of differing types can be combined.

At the same time, the improved solution—for the first time—offers a WYSIWYG system that automatically generates and displays previews of the tabular layout formats based on the layout specifications without any report writer (or HTML) coding whatsoever. The records of a family are displayed in tabular form along with the participating fields and attributes. As each field or attribute is hidden or used to pivot or sort, and as each of the pivot-specific sorting and display characteristics are set, the corresponding table layouts for the family are automatically generated by the system and the preview display updated in real time, providing instant interactive feedback and allowing tweaking, tuning, and iterative refinement of the table layout of each family, in sharp contrast to the manual approach that does not support this incremental, iterative layout process.

The result is a system in which the report writer (or HTML) requires no complex code for pivoting tabular layout formats, no special coding for each category or family, and no intelligence about the underlying data. Instead, everything is driven by the extended taxonomy structure, and changes that occur in the taxonomy as well as the underlying records themselves are immediately reflected in the published output. In effect, the intelligence about how to lay out and format the records in each family is built into the taxonomy itself where it belongs rather than into special category- and family-specific programming code in the report writer.

Another feature of this scheme is that, just as with the family partitioning hierarchy, the layout structure defined for each node is inherited by all nodes that are children of that node in the extended taxonomy. And once again, the inherited structure can be overridden on a node-by-node basis so that different children of a category can have different pivoting, sorting, display sequence, and other pivot-specific sorting and display characteristics.

Specific pivot features and features for setting pivot-specific sorting and display characteristics include but are not limited to those listed in the table below:

| Feature | Description |
|---------|-------------|
| Stack Pivots | Add, remove, or inherit stack pivots for the current node |
| Vertical Pivots | Add, remove, or inherit vertical pivots for the current node |
| Horizontal Pivots | Add, remove, or inherit horizontal pivots for the current node |
| Sorts | Add, remove, or inherit sorts for the current node |
| Hidden | Add, remove, or inherit hidden fields and/or attributes for the current node |
| Display Order | Set, reset, or inherit the display order for the current node |
| Column Names | Set, reset, or inherit the display name of the fields and attributes for the current node |
| Pivot Names | Show or hide the name of the pivot column in the tabular layout format |
| In Stack Pivot Header | Display the stack pivot name in the stack pivot header |
| In Vertical Pivot Column Header | Display the vertical pivot name in the vertical pivot column header |
| In Horizontal Pivot Row Header[1] | Display the horizontal pivot name in the horizontal pivot row header |
| Span Above Horizontal Pivot Values[1] | Display the horizontal pivot name in a spanning row above the horizontal pivot values |
| With Horizontal Pivot Values[1] | Display the horizontal pivot name in each cell with the horizontal pivot values |
| Pivot Values | Display combined pivot values as a single line or as multiple lines |
| Column Titles at Top[2] | Display column titles once at the top of a stack pivot table |
| Column Titles Interleaved[2] | Display column titles interleaved within a stack pivot table before each sub-table |
| Separate Stack Pivot Tables[2] | Maintain each stack pivot sub-table as a separate table |
| Sort Ascending | Sort the column or pivot in ascending order |
| Sort Descending | Sort the column or pivot in descending order |
| Sort in Natural Order | Sort the column or pivot in natural order (text values only) |
| Units | Show or hide the unit of measure associated with each numeric value |
| Merge Like Cells in Column | Merge cells of the column with the same value into a single cell |
| Promote Column if Same | Display the column value with the common information if all cells have the same value |
| Demote Column to Footnotes | Display the column values as footnotes |
| Hide Column if Empty | Hide the column if all the cells are empty |

[1]Horizontal pivots have three variants.
[2]Stack pivots have three variants.

Implementation and Method of Use
See the discussion on families in the section entitled Catalog Manager Data Format.
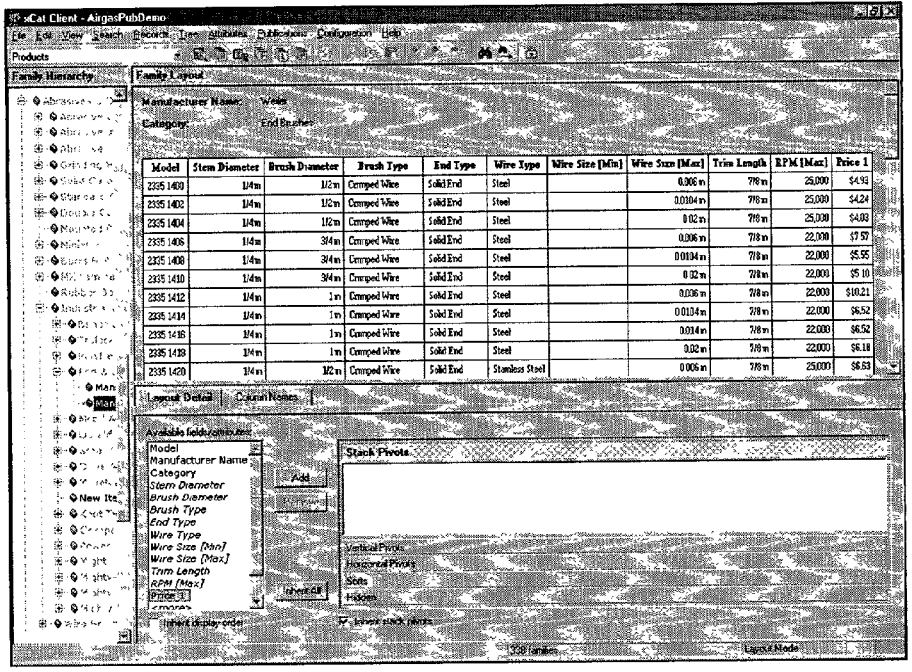
Example 1. The Weiler End Brushes family before pivoting
Example 2. The Weiler End Brushes family after stack, vertical, and horizontal pivoting
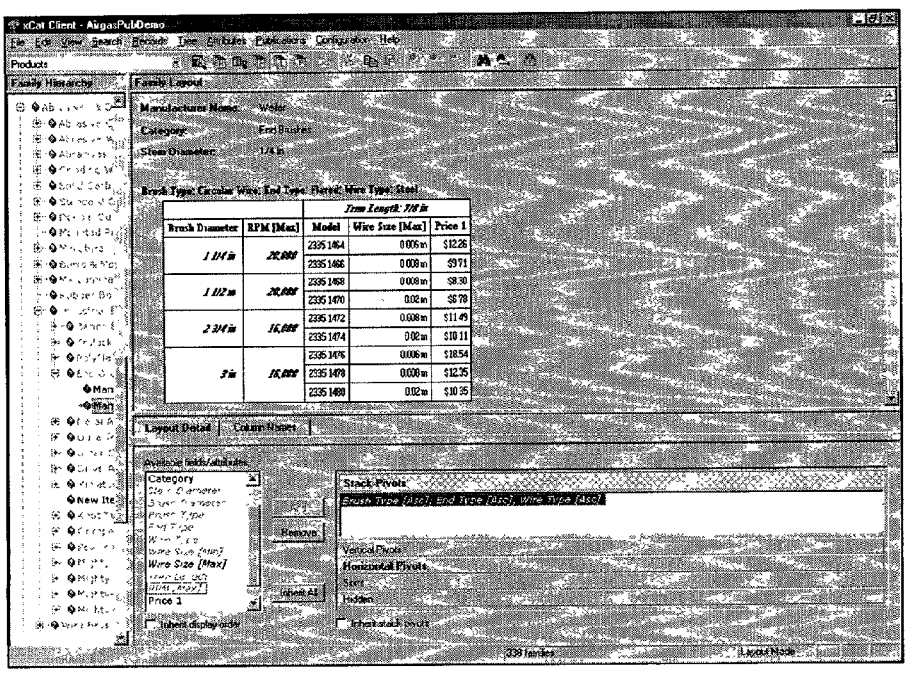

The Innovations

Among the innovations are: (a) extending the taxonomy structure to support automatic, formatted layout and publishing of presentations coupled with WYSIWYG generation and preview display of the resulting table; (b) abstracting and generalizing the concepts of stack, vertical, and horizontal pivots to support a wide variety of different table layouts; (c) abstracting and supporting the different variants of the stack and horizontal pivots; (d) extending the taxonomy with layout information that identifies fields and attributes on which to pivot and sort, which ones to hide, the display sequence of the remaining fields and attributes, and additional pivot-specific sorting and display characteristics; (e) allowing multiple layout items to be either combined or nested; (f) allowing cells with the same value to be automatically merged, columns with all the same value to be promoted, and columns that are empty to be hidden; (g) providing a WYSIWYG system that automatically generates and displays pivoted tabular layout formats in real time and allows the layout process to be interactive, incremental, and iterative; (h) the ability to specify pivot information at any level in the partitioning hierarchy, so that different nodes within a single partition can be laid out differently, and (i) the inheritance and overriding of inheritance of layout information in the partitioning hierarchy.

Media-Independent Publishing

Problem Statement

Publishing catalogs of product information to paper and to electronic media historically have been two very different and distinct processes, with a very different level and type of effort involved, and very different standards and expectations for quality. The challenge is to eliminate the distinctions between paper and electronic output and combine the best of both media in a way that brings to electronic catalogs the structure and high standard of quality typical of paper catalogs, and at the same time, dramatically reduces the cost of laying out paper catalogs by flexibly, programmatically, and automatically generating page layouts in real time.

Known Solutions and Their Shortcomings

Paper catalogs are meticulously laid out with existing page layout programs a page at a time and formatted a table at a time by manually populating page layouts with product data, a process that is time-consuming, tedious and very, very expensive. There is also no easy way to experiment with different tabular layout formats and views of the data, and once a page has been laid out, it is difficult to add or remove records from the tables without destroying the structure of the page and requiring that it be laid out again (sometimes from scratch) which discourages updates and means that catalog pages tend to quickly become out-of-date. The upside of this complex process, however, is that manual page layout usually results in high page density, flexible and well-structured tabular layout formats using pivots to eliminate redundant information, and a very high overall standard of quality. Notwithstanding the high level of quality, however, it remains difficult to enforce a uniform look throughout a publication because more than one person is usually involved in the page layout process, and each lays out pages somewhat differently.

By contrast, electronic catalog pages are typically database-driven and generated programmatically in real-time. Since page layouts do not actually exist until the electronic catalog page is displayed, new products can be added and old products removed without disturbing the system or the published output. Unfortunately, the downside of this flexibility is that automatically generated electronic catalog pages are usually no more than wide, ugly, "spreadsheet-style" tables of data with redundant information, very little structure, and none of the sophisticated tabular layout formats that are standard for paper pages. With category-specific attributes and a large number of categories, it is even more impractical to have a customized hand-coded display for each family, so generic unstructured presentations are even more the norm.

Moreover, when publishing to multiple media, none of the effort invested in meticulously laying out paper pages can be leveraged for the electronic catalog, since both the structure of the tabular layout formats as well as the product data are typically trapped within the page layout itself, while the electronic catalog requires that the data be stored and managed in a database to be searchable and generated in real-time. Thus the worlds of the two media are completely distinct and non-overlapping, very difficult to integrate, and require two distinct publishing efforts.

Improved Solution

The improved solution layers on top of the structure for automatically formatting and publishing database data described in the previous section, in which all of the tabular layout formats that are typically stored in the page layout are now instead captured and stored in the database alongside the product data itself. In this scheme, the searchable, database-driven electronic catalog can not only serve up the product data but also the formatting data, preprocessed as to the structure of the pivoted, tabular layout formats, to be rendered in real-time by the report writer (such as ASP-generated HTML), in a data-independent fashion, even on a catalog with many categories and category-specific attributes. The report writer code itself (or HTML) need only handle the preprocessed pivot tables and requires no complex code for pivoting tabular layout formats, no special coding for each category or family, and no intelligence about the underlying data. Using the structure described in the previous section, electronic catalogs for the first time can now have the density and layout quality of paper catalog pages while maintaining their database-driven searchability.

At the same time, the improved solution substantially eliminates the manual page layout process for paper catalogs. All of the time and effort invested in defining the appropriate tabular layout formats for each family now can be immediately leveraged for paper catalog publishing. Instead of requiring that the user manually populate page layouts with product data, the system automatically generates the page layouts by combining product data and formatting data from the database and then using the page layout program's API (for programs such as QuarkXPress or Adobe InDesign) or intermediate ASCII file format (for programs such as Xyvision XPP) to render pages automatically. This dramatically reduces the cost of laying out paper catalog pages, allows changes to the product data to be reflected immediately in subsequently generated output, supports the on-demand generation of custom catalogs on product subsets with no additional effort, and results in a more uniform look throughout the publication since every page is being generated dynamically and automatically by the system.

Each paper publication starts out as a snapshot of the family partitioning hierarchy and its associated formatting information. Any of the formatting specifications defined and stored in the family partitioning hierarchy and used for electronic catalog publishing can then be changed in any way for each paper publication, providing almost unlimited flexibility to create custom paper catalogs each based upon the electronic standard but laid out in a fashion that is as similar to or as different from any other catalog as necessary. In addition, the system offers the following per-publication flexibility:

- A product mask can be applied when the snapshot is taken to limit the set of products appearing in the paper publication, so that each publication can have a different, custom subset of the entire product set (masks can also be applied electronically, and/or search parameters specified, to limit the set of products appearing in electronic output).
- The order of the partitions in a publication can be rearranged when the snapshot is taken and set in any order (by contrast, partitioning order is fixed in the family partitioning hierarchy).
- The sequence of the families in a publication can be rearranged in any order (by contrast, the family sequence is fixed in the family partitioning hierarchy).
- A family can be copied from the family partitioning hierarchy into the publication to include families that were not initially included in the publication.
- Each family can appear in multiple locations in the publication and each can be individually formatted, can include a different subset of the columns and common information, and can contain a different subset of the records in the family (by contrast, each family in the family partitioning hierarchy can appear only once, contains a fixed subset of the columns and common information, and contains all of the records).

Additional features for paper publishing that allow publication-specific restructuring and reformatting of each family as well as the entire publication are listed in the table below:

| Feature | Description |
| --- | --- |
| Layout Detail | Change any or all of the tabular layout format settings of the current node |
| Column Names | Change any of the display names for the current node |
| Records | Exclude any of the records of the current node, or include any that had been masked out |
| Family Data Refresh Options | Exclude any common information of the current node Include or exclude new records, columns, or common information |
| Detail | Display the criteria for the current node |
| Format | Specify additional formatting options |

The Innovations

Among the innovations are: (a) layering both the electronic and paper publishing process on top of the same extended taxonomy structure for automatically formatting and publishing database data; (b) using tabular layout formats that are captured and stored in the database alongside the product data itself rather than stored in the page layout; (c) publishing high-quality output to the web using this layout information stored in the database; (d) using the page layout program's API or intermediate ASCII file format to render pages automatically; (e) allowing a product mask to be applied when the publication is first created; and (f) allowing the layout detail, the column names, the set of records, and the common information to be individually customized for each family of a particular publication.

Catalog Manager Data Format

Overview

This document describes the current internal or low level database organization or schema for A2i Catalog databases. As such, it changes as a reflection of the growth or evolution of A2i products. The Catalog Manager Data Format (CMDF) document is confidential and proprietary to A2i, Inc.

Databases

On a given A2i Database Server a global database contains a list of all A2i Catalogs on that machine. The global database is always named A2i_xCat_DBs. Within it is a table that holds the logical or publicly known names of catalogs and the actual database names used for storage.

Three databases are used to represent each catalog.
- Base database that holds everything but image or Large Object data.
- Originals database that holds the bitmap data for the original imported images.
- Thumbnails database that holds the scaled down 200x200 bitmap data of the original imported images.

On Oracle servers, there needs to be a sequence called A2I_SEQUENCE starting at 1 incrementing by 1 for each of the 3 databases.

Catalog Table

There is a single table called
_A2i_CM_Servers_

| SQL field name | SQL Field Type | Description |
|---|---|---|
| CatalogName | Varchar 128, not NULL | Logically or publicly known Name of an A2i Catalog. |
| MainDB | Varchar 30, not NULL | Name of the database for most non-binary data |
| OrigDB | Varchar 30, not NULL | Name of the database for original binary data |
| ThumbDB | Varchar 30, not NULL | Name of the database for scaled down image data |
| VariantDB | Varchar 30, not NULL | Name of the database for image variant data |
| Date1 | Date, NULL | Date/Time field for future or miscellaneous use |
| Description | Varchar 255, NULL | Miscellaneous use |

Create a Unique valued index on CatalogName

Each A2i Database Server may differ from other DB Servers. Any parameters or settings which are modified for an individual DB Server are maintained in the A2i_xCat_DBs database in a settings table.

Settings Table

There is a single table called
_A2i_CM_Settings_Error! Reference source not found.

| SQL field name | SQL Field Type | Description |
|---|---|---|
| Name | Varchar 128 | The name of the parameter. |
| Setting | Varchar 128 | The value the parameter is to take. |

Create a Unique valued index on Name

At the present time there are two settings:
- DataPath     The directory location where DB data files are to be created.
- BackupPath     The directory location where backup files are to be created.

Each Catalog has a table with a single record that is used to hold for state information

Server Table

There is a single table called
_A2i_Server_ that requires exactly 1 record.

| SQL field name | SQL Field Type | Description |
|---|---|---|
| ServerName | Varchar 50, not NULL, default empty string | Name of xCat Server (XCS.exe) that is currently using this SQL database. The XCS.exe program fills this in. |
| StartupTime | Datetime, not NULL, default any time | time the current server connected to this SQL database |
| LastCheckIn | Datetime, not NULL, default any time | last checkin time, the current server checks in every minute. |
| FamilyCatFieldId | Int 4, not NULL, Default 0 | main table field Id of the fields used as the base field in the family table. If no family table exists, this will be 0. |
| DBSchemaVersion | Int 4, not NULL, default 0 | Revision number of the database schema or structure. High order short integer is major version, low order short integer is minor version. XCS uses this to determine if it must upgrade the database structure. |

| | | |
|---|---|---|
| LockVersion | Int 4, NULL | Used by administrative console program to lock database for structure changes |

Tables Table

This table contains the descriptions of all Primary Data Tables. Primary Tables have the name _A2i_x_ where x is a number starting at 1. The Primary Tables table has the following name:
    _A2i_CM_Tables_

Note: Every entry in this table represents a Primary Table in the database. There is no need for a null entry.

The Field Structure is as follows:

| SQL field name | SQL Field Type | Description |
|---|---|---|
| TableId | Int 4, not NULL, Primary Key | Id defining the table. First valid Id is 1. Unique. Actual table name is _A2i_x_ where x is the Id. |
| TableName | Varchar 50, not NULL | User readable name for the table. Not null or empty. Must be unique when converted to upper case and all whitespace is removed. |
| TableType | Int 4, not NULL | Type of table, valid values are:<br>    0, 1, 2, 4, 11<br>Refer to the Table Type Schedule for a list of TableType values and a description of each. |
| Lookup | Varchar 50, not NULL | This is a text version of the field Id in this table that specifies which field represents the entire record. This field will replace the Id references in the linking table. So if the main table field indicates id's 3,4,5 the Lookup field from records with Id's 3,4,5 will be displayed in place of the numbers.<br>The format is F*id*, so if the field Id of the lookup field is 100 the value of this field will be F100 |
| Params | Varchar 255, NULL allowed | MainTable : Id of associated MaskTable<br>MaskTable : Id of associated MainTable<br>HierAttrTable: Id of image object table |
| AttributeImageTableId | Int 4, not null, default 0 | Image Lob Data Table Id associated with this category table the images for its attributes. |
| FVImageTableId | Int 4, not null, default 0 | Image Lob Data Table Id associated with this category table the images for its feature values. |
| NextAutoId | Int 4, not null, default | Tracks the next available Id field for the AutoId field type (not yet implemented, but necessary in the |

|  | 1 | structure) |

Create a Primary, Unique Valued, Clustered Index on TableId
NOTE: the Views field has been removed.

Table Type Schedule

| TableType Value | Primary or Lob | TableType Description |
|---|---|---|
| 0 | P | MainTable |
| 1 | P | FlatTable, essentially the same as MainTable except it cannot currently have an associated Mask Table. |
| 2 | P | HierTable, Like Flat table, but every record has a parent record. The Id of the top-level node is 0. This table type is usually displayed in a tree format. |
| 4 | P | HierAttrTable, Hierarchy table having associated attributes. Each record in this table can be linked to 0 or more attributes. Children inherit their parent's links. Main Table records can be linked to leaf nodes in this table. |
| 5 | L | TextDataTableType, |
| 6 | L | ImageDataTableType |
| 7 | L | SoundDataTableType |
| 8 | L | VideoDataTableType |
| 10 | L | ExtDataTableType |
| 11 | P | MaskTable. This looks like a hierarchy table, except it always has a Mask field which contains a BitVector specifying which records in its linked MainTable apply to its own records. |
| 18 | L | PDFDocumentTable |

Table Type Schedule

Field Type Schedule

| Field Type Value | Field Type Description | DBMS Mapping SQL Server | Oracle |
|---|---|---|---|
| 0 | Integer Field, default value is NULL | Int 4 | Number (10) |
| 1 | Real4Field, allow NULLs, default value is NULL | Real 4 | Float |
| 2 | CurrencyField, allow NULLs, default value is NULL | Real 4 | Float |
| 3 | DateField, allow NULLs, default value is NULL | Datetime | Date |
| 4 | TimeField, allow NULLs, default value is NULL | Datetime | Date |
| 5 | BoolField, allow NULLs, default value is NULL | Tinyint | Number (3) |
| 6 | FixedWidthText, not NULL, default value is empty string | Char | Char |
| 7 | FlatSubTableField, holds Id of record in a separate FlatTable. The Lookup field for the record with the specified Id will be displayed. Used to allow the field to be parametrically searched upon. Not NULL, default value is 0 | Int 4 | Number (10) |
| 8 | HierSubTableField, same as FlatSubTableField, but links to HierTable. | Int 4 | Number (10) |
| 9 | INVALID, previously FlatAttrSubTableField | --- | --- |
| 10 | HierAttrSubTableField, same as HierSubTableField but with attributes. Not NULL, default value is 0 | Int 4 | Number (10) |
| 11 | FlatMultiSubTableField, this indicates this field will contain 0 or more links to a FlatTable. Being a virtual field, there will not be an actual field in the _A2i_x_ table. Values are stored in a separate table. Needed for data normalization and SQL query generation. SQL, no actual field. | --- | --- |
| 12 | TextField, contains Id of single large text block, not NULL, default 0 | Int 4 | Number (10) |
| 13 | MultiTextField, contains 0 or more ids of large text blocks. This is a virtual field in that there will not be an actual field in the _A2i_x_ file. The values will be stored in a separate table _A2i_x_f_ where x is the value of this table Id and f is the value of this field id. | Int 4 | Number (10) |
| 14 | ImageField. This contains the Id of a single image, not NULL, default 0 | Int 4 | Number (10) |

| | | | |
|---|---|---|---|
| 15 | MultiImageField. This indicates this field will contain 0 or more image ids. This is a virtual field in that there will not be an actual field in the _A2i_x_ file. The values will be stored in a separate table _A2i_x_f_ where x is the value of this table Id and f is the value of this field id. | Int 4 | Number (10) |
| 16 | SoundField, Not Yet Implemented (NYI) | --- | --- |
| 17 | MultiSoundField, NYI | --- | --- |
| 18 | VideoField, NYI | --- | --- |
| 19 | MultiVideoField, NYI | --- | --- |
| 20 | Reserved for Future Use | --- | --- |
| 21 | Reserved for Future Use | --- | --- |
| 22 | ExtField, NYI | --- | --- |
| 23 | MultiExtField, NYI | --- | --- |
| 24 | Name field, Text string containing text and codes to represent Title, First, Middle, Last, suffix for name. Format to be determined. SQL Varchar, not NULL, default empty string | Varchar | Varchar2 |
| 25 | MeasurementField used when a number is not descriptive enough. Examples are length or temperature. This will generate 2 fields in the _A2i_x_ table, Fx and Ux. Fx is the actual value as a real 4 allow NULLs; Ux is the unit of measure int 4 allow NULLs, | real 4 and int 4 | Float and Number (10) |
| 26 | TimeStampField, used when both date and time are needed. Allow NULLs, default value is NULL | Datetime | Date |
| 27 | NormalizedTextField, special type of fixed width text field that sorts, and searches based on the normalized version of the string it contains. Normalization currently removes all non alpha-numeric characters. NOTE, the value if this field is the actual string value containing non-normalized characters, i.e. "12-34.b/56", however it sorts and searches as if the string were "1234b56", not NULL, default empty string | Varchar | Varchar2 |
| 28 | Real8Field, 8 byte floating point number, allow NULLs, default is NULL | Real 8 | Float |
| 29 | HierMultiSubTableField, same as FlatMultiSubTableField (11) but the table it links to is a hierarchy table. | --- | --- |
| 30 | Internal type, not allowed as actual field | --- | --- |
| 31 | MultiTemplateField, NYI | --- | --- |
| 32 | PDFDocumentField, NYI | --- | --- |
| 33 | MultiPDFDocumentField, NYI | --- | --- |
| 34 | AutoIdField, not NULL, Create a Unique index on this field | Int 4 | Number (10) |

| | | | |
|---|---|---|---|
| 35 | LargeTextField, allow NULL (Oracle: default Empty_Clob()) | Text | CLob |
| 36 | LogField, allow NULL (Oracle: default Empty_Clob()) | Text | CLob |
| 37 | Multi Measurement Field. This indicates this field will contain 0 or more Measurements(Value, Units). This is a virtual field in that there will not be an actual field in the _A2i_x_ file. The values will be stored in a separate table _A2i_x_f_ where x is the value of this table Id and f is the value of this field id. | --- | --- |

*Field Type Schedule*

Fields Table:

Describes every non-Id field in all the primary tables in the database. Id fields are assumed to always exist in every primary table and have the field name Id. They are not included in this table. The fields table has the following name
   _A2i_CM_Fields_
All entries refer to fields; there is no need for a null entry.

Note, the Description of FieldType specifies the SQL field types for the primary tables.

The Field Structure is as follows

| SQL field name | SQL Field Type | Description |
|---|---|---|
| PermanentId | Int 4, not NULL, Identity (1, 1) | Ever increasing Id used to make sure newly added records are not confused with previous records that had the same id. Oracle does not need the Identity(1,1) descriptor. |
| FieldId | Int 4, not NULL, Primary Key | Id defining the field. First valid Id is 1. Unique. Actual table field names are Fx where x is the Id. Exceptions: Field type 11 has no physical field in the _A2i_x_ table. Field type 25 has an additional Ux field to specify type of units. |
| TableId | Int 4, not NULL | Table Id to which this field belongs |
| FieldName | Varchar 128 | User readable name for the field. Not null or empty. Must be unique among all FieldNames for a given TableId when converted to upper case and all whitespace is removed. |
| FieldType | Int 4, not NULL | Type of field, valid values are 0 to 36. Refer to the Field Type Schedule for a list of FieldType values and a description of each. |
| FieldParams | Varchar 255 not NULL, default "" | This provides extra information for some of the above field types. If any of these fields require spaces after the last non-space character, you may enclose this field in "" marks. These double quotation marks are stripped off when this field is read in to the xCat server. The field types and their format are: |

| | | |
|---|---|---|
| | | 2 – (CurrencyField), the number of decimal places, whether to allow fractions (0, 1) and the actual currency symbol(s) to preceed the currency amount.   examples:<br>2,0,"eur "   --- (2 decimal, no fractions)<br>3,1,"$"     --- (3 decimal, allow fractions) |
| | | 5 – Boolean Field<br>{True String} \| {False String} \| T or F<br>Example, Red \| Blue \| T means the True String is Red, False String is Blue and the default is the True String (Red). |
| | | 6 , 27 (FixedWidthText, NormalizedText)– number of characters |
| | | 7,8,10 - _A2i_x_ primary tableId that this field links to. Optionally followed by comma and the default value for new records. TableId[, default value]. If no value is specified or the value is not a valid record, the default value is 0 |
| | | 11,29 – _A2i_x_ primary tableId that the id's in this field refer to. Being multi-valued fields, the default value is always none. |
| | | 12,14,16,18,22,32 - _A2i_data_x_ object data table Id that this field refers to. |
| | | 13,15,17,19,23,31,33 – _A2i_data_x_ object data table Id that this field refers to. |
| | | 25, 37 – decimal places, allow fractions, Measurement Type Id, Defaults Units of Measure Id. E.G.<br>3,1,1,1  --- 2 decimal places, allow fractions, meas id 1, units id 1<br>-1,0,0,0  --- max float decimal places, no fractions, meas 0, id 0 |
| | | 3,4,26 DateField, TimeField, and TimeStampField. To use the current time as the default value put a T here, otherwise leave it blank or put an F here. Valid values are T, F or nothing at all. |
| Position | Int 4, not NULL | Holds the default display position for fields within a table. Beginning with 0, each position is unique per TableId. Each user can override the default at his workstation. |
| UseInKeyword | Bit 1, not NULL, default 0 | Determines whether it can be used in keyword searches |

Create a Primary, Unique Valued, Clustered Index on FieldId
Create a Unique Valued Index on TableId, Position

Direct Data Tables

Primary Tables

These tables contain all non-attribute-related information.

These tables are named:
_A2i_x_
where x is the Id specified in the TableId field of _A2i_CM_Tables_. In typical usage, when there are multiple tables having this form, one table is considered the main table with the remainder acting as sub tables used for multi-values, etc. However there is no theoretical limit to the number of main tables.

Every primary table has the following fields

| SQL field name | SQL Field Type | Description |
| --- | --- | --- |
| Id | Int 4, not NULL, Primary Key | Id of the record. Valid Id's start at 1 for new records |
| PermanentId | Int 4, not NULL, Identity (1, 1) | Ever increasing Id used to make sure newly added records are not confused with previous records that had the same id. Oracle does not need the Identity(1,1) descriptor. |

Create a Primary, unique valued, clustered index on Id

Every primary table has a permanent NULL record with Id = 0 and all fields set to the default value for that field type. See the description of the _A2i_CM_Fields_ table for the default values. When creating a database, make sure all _A2i_x_ tables have this NULL record.

This NULL record is needed because any table can be a lookup for another table. On initial record creation for a table, all fields must contain valid values. This means all lookup fields must link to an actual record in another table. By default they link to this empty record. This maintains a valid database even if the lookup fields are not changed.

Other fields have names F$x$ where x is the FieldId specified in the _A2i_CM_Fields_ table. The types of these fields are specified in the _A2i_CM_Fields_ table. We have several reasons to use field names F$x$ instead of more human friendly names like 'Color field'.
1. Performance. We only need to know the Id of a field to access it. This results in less storage in the server and client components and small network packets. It also speeds up the search for a particular field.

2. Cross Database independence. This format is valid for SQL databases, Codebase, MS Access or any other standard database system. We use each database simply as a container. By restricting the field names, we guarantee that all names will comply with naming conventions on the various database systems used.

Some exceptions to this general naming of fields F$x$ are as follows:
1. Any multi-valued fields, Field type 11 (FlatMultiSubTableField) and 29 (HierMultiSubTableField) and object data fields 13,15,17,19,23,31,32,33 do not have physical fields in the _A2i_x_ table
2. Field type 25 (MeasurementField) has an additional field named U$x$ (where $x$ is the FieldId) used to specify the type of units used.

Mask Tables:

A Mask table is a special type of primary hierarchical table with an additional field called Mask. Following the same rules, it is named: _A2i_x_
This additional Mask field stores the bits of a BitVector to track record Ids in another linked table. It is like a sub-table in that each of the records in this table correspond to multiple records in a linked main table, however the link is stored in this table as a mask instead of in the main table as a category field. For example, a record in the mask table with the mask having bits 1,2 and 10 set means that this record corresponds to records in its linked main table with record ids 1, 2 and 10.

In the _A2i_CM_Tables_ table, the mask table entry has a type of
    11 = MaskTable
and the Params field is the table Id of the linked main table.
The main table has its Params field set to the Id of the mask table Similar to other primary tables, every mask table has a standard Id field and also has any fields specified for it in the _A2i_CM_Fields_ table. The additional Mask field, described below, differentiates it from other primary tables.

| SQL field name | SQL Field Type | Description |
| --- | --- | --- |
| Mask | Image 16, not NULL, default value (0x00) | Bit field of the corresponding record ids in the linked main table |

Hierarchy Tables:

A Table of type HierTable and HierAttrTable table relies on an additional table to describe the hierarchy relationship. The table is named:

_A2i_H_x_ where x is the TableId of the HierTable or HierAttrTable

The structure of this table follows:

| SQL field name | SQL Field Type | Description |
| --- | --- | --- |
| Id | Int 4, not NULL, Primary Key | Id of an existing Id in the _A2i_x_ HierTable or HierAttrTable, where x is the same value as in this tables name |
| ParentId | Int 4, not NULL | Parent Id. Must specify an existing Id in the A2i_x_ table, where x matches. |
| Position | Int 4, not NULL | Position of this node under its parent. First position is 0. No missing positions are allowed, it must be 0,1,2,3 .. and so on. If a node is removed all children after it must have their positions decreased by 1. If a child is inserted, all nodes after it must have position increased by 1. |
| ShowChildren | Bit, not NULL | Determines whether the descendents of this node should be displayed in the search lists, and replaced with this node's name in the result list. Set to 1 means children are shown, set to 0 means children are hidden and replaced |
| OriginalId | Int 4, not NULL, use 0 as default to convert existing databases | Id of original record that this node is an alias of. OriginalId = 0 means this is an original node. |

Create a Primary Key, Unique Valued, Clustered Index on Id.
Create a Unique Index on ParentId + Position.

This table should contain a master parent record with:
    Id = 0
    ParentId = -1
    Position = -1
    ShowChildren = 1
    OriginalId = 0

All top-level nodes will then use this record as their parent.

Multi Value Tables:

Fields with type 11 (FlatMultiSubTableField), 29 (HierMultiSubTableField), object data fields 13,15,17,19,23,31,32,33 and MultiMeasurementField 37 do not have physical fields in their data table. The lookup Ids are stored a separate multi-value table.

The multi-value tables are named
_A2i_x_f_
where     x is the TableId of the table containing a multi-valued field.
          f is the FieldId of the field.

The structure of this table follows for type 11,29,13,15,17,19,23,31,32,33:

| SQL field name | SQL Field Type | Description |
|---|---|---|
| Id | Int 4, not NULL, Primary Key | Id of an existing Id in the _A2i_x_ where x is the same value as in this table's name. |
| SubId | Int 4, not NULL | SubId. Must specify an existing Id in the lookup table A2i_n_ or A2i_Data_n_. n is a simple number taken from A2i_CM_Fields_.FieldParams where A2i_CM_Fields_.FieldId = f and is dependent on A2i_CM_Fields_.FieldType being on of several Multi-Value Field Types [ via the IsMultiValuedField() test] |

Create a non-Unique, clustered index on Id.
Create a Unique Index on Id, SubId
Create a non-Unique Index on SubId The structure of this table follows for type 37:

| SQL field name | SQL Field Type | Description |
|---|---|---|
| Id | Int 4, not NULL, Primary Key | Id of an existing Id in the _A2i_x_ where x is the same value as in this table's name. |
| Value | real 4, not NULL | Measurement Value |
| Units | Int 4, not NULL | Measurement Units Id |
| Position | Int 4, not NULL | Position in list of value for this Id |

Create a non-Unique, clustered index on Id.
Create a Unique Index on Id, Position The reason the multi value lookup fields are stored in a separate table was to normalize the database to allow for SQL queries to search on multi value criteria and to return results stored in multi value fields.

Attribute Tables

Attributes

How Attributes Relate To Records:

What is an Attribute?
An attribute is a parameter used to classify and describe a record, (i.e. 'screen size' of a monitor). It is similar to a category but only applies to subset of the entire record set. If it applied to all records it would simply be a category. This means that one group of records will have one set of attributes describing them, while another group of records will have completely different attributes describing them. An example is 'screen size' of a monitor and 'processor speed' of a computer. Both monitors and computers are records in the same table but they have different attributes describing them.

How Attributes Relate To Records:
Attributes apply to groups of records. A group of records is specified by creating an HierAttrSubTableField in the main primary table and setting the value of this field to the Id of a record in a table of type HierAttrTable. For Example, an HierAttrSubTableField called 'SampleCategoryField' can be created in the main primary table, and another primary table of type HierAttrTable called 'SampleCategoryTable' can be created. One record in the 'SampleCategoryTable' may be a record describing the 'Monitor' category. Now all records in the main primary table with 'SampleCategoryField' linked to the record describing the 'Monitor' category in 'SampleCategoryTable' are in the Monitor group.

Attributes are assigned to a group by linking them to a set of records in a table of type HierAttrTable. Continuing the example, an attribute called 'Screen Size' can be linked to the record in 'SampleCategoryTable' that describes the 'Monitor' category. Now all records in the main table with 'SampleCategoryField' that link to the record describing the 'Monitor' category in "SampleCategoryTable' will have the 'Screen Size' attribute.

NOTE: For each table of type HierAttrTable, only 1 field of type HierAttrSubTableField in the entire database can link to it.

An attribute is either Text or Numeric. Previously these were referred to as Feature (for Text) and Characteristic (For Numeric). The naming of fields and tables still refers to Features and Characteristic:

A Text Attribute is an enumerated list of Text Values. An example is "Valve Type". There is a small finite set of valve types.

A Numeric Attribute is continuous. An example is length. Although you could enumerate all lengths in a list of products you gain certain advantages by treating it as Numeric. One is searching by range (not yet implemented). Another is the ability to convert between units (feet to meters).

Attribute Definition Tables:

These tables contain the definitions of all attributes in the database.

They are named

_A2i_A_x_ where x is the TableId of the HierAttrTable that contains all the categories that these attributes are allowed to link to.

The structure of this table follows:

| SQL field name | SQL Field Type | Description |
| --- | --- | --- |
| AttrId | Int 4, not NULL | Id defining the Attribute. First valid Id is 0. Cannot repeat within this table. |
| PermanentId | Int 4, not NULL, Identity (1, 1) | Ever increasing Id used to make sure newly added records are not confused with previous records that had the same id. Oracle does not need the Identity(1,1) descriptor. |
| AttrName | Varchar 128, not NULL | Human readable name. This will be displayed when searching or viewing records |
| AttrType | Int 4, not NULL | Determines if this is a Feature (Text) or a Characteristic (Number) and what values the attribute contains. Use bitwise OR on the following values to generate the AttrType. If any flags are set, this attribute is a Characteristic, otherwise it is a Feature<br>    1 – Minimum<br>    2 – Maximum<br>    4 – Typical<br>    8 – Nominal (most common)<br>    16 – Average |
| AttrDefn | Varchar 255, not NULL | Long description of the attribute |
| AttrAlias | Varchar 128, not NULL | Not used yet, leave blank |

| | | |
|---|---|---|
| AttrParam | Int 4, not NULL | For Characteristics this determines the measurement type.<br>1 – length<br>2 – weight<br>For Features this determines whether the attribute is single or multi select<br>0 - single select<br>not 0 – multi select |
| DecimalPlaces | TinyInt 1, not NULL | For Characteristics this determines the number of places after the decimal to display. The default is 3, meaning that the value 0.0255 will be displayed as 0.026. The specified number of places are always used so that the number 4 will be displayed as 4.000 |
| AllowFractions | Bit 1, not NULL, default 0 | ?? |
| MeasurementType | Int 4, not NULL | For Characteristics this determines the measurement type of the value. Possible values are:<br>0 = None<br>1 = Length |
| UnitsOfMeasure | Int 4, not NULL | For Characteristics this determines the default units of measure of the value. This is the value that is automatically filled in when you set the attribute value from the catalog client. Also when you change the MeasurementType of an attribute, the first units of measure that you select will automatically overwrite the current units for all data values of this attribute. Its interpretation depends on the value of the MeasurementType field: |
| ImageId | Int 4, not NULL | Image Id of the image for this attribute. The Image Table Id is contained in the tables' table Params field for the associated category table. |
| IsMultiValued | Bit, not NULL | Indicates whether this Attribute record ... |
| CoupledAttrName | Varchar 128, not NULL | |
| CoupledDecimalPlaces | TinyInt 1, not NULL, | |
| CoupledAllowFractions | Bit, not NULL | |

| CoupledMeasurementType | Int 4, not NULL | |
| CoupledDefaultUnitsOfMeasure | Int 4, not NULL | |
| CoupledSymmetricSearch | Bit, not NULL | |

Create a Unique Valued, Clustered Index on AttrId

Category Attribute Linkage Tables:

These tables determine which attributes apply to which categories (categories are records in a table of type HierAttrTable). By creating a record in this table you link an attribute to a category. All records in a separate table linked to that category will be described by the Attribute.

The names of these tables are
_A2i_CA_x_
> where x is the TableId of the HierAttrTable that contains all the categories that the Attributes are allowed to link to.

The structure of this table follows:

| SQL field name | SQL Field Type | Description |
| --- | --- | --- |
| Id | Int 4, not NULL, part of Primary Key | Id defining the Category. Must specify an existing Id in the _A2i_x_ FlatAttrTable or HierAttrTable, where x is the same value as in this tables name |
| AttrId | Int 4, not NULL, part of Primary Key | Attribute Id. Must specify an existing AttrId in the A2i_A_x_ attribute definition table, where x matches. |
| Priority | Int 4, not NULL | Priority of this attribute link. Lower numbers cause this attribute to appear higher in the list of all attributes linked to this category or any of its descendants. Valid values are 1 to 100, default 50. |

Create a Non-Unique, Clustered Index on Id.
Create a Primary, Unique Valued Index on Id + AttrId.
Create a Non-Unique Index on AttrId.

What is Attribute Priority? This number ranks the attributes linked to a particular category according to importance of display.

When a single category is selected in a Search Pick List, the attributes linked to that category and all of its ancestors are shown. Attributes with lower priorities are shown first. Attributes with the same priority are sorted by Attribute Name.

When a result set of records all having the same category is displayed. The attributes are displayed as above.

We don't yet know what to do if the records have different categories because that could cause the same attribute to be linked with two different priorities.

Feature Values Tables

These tables determine the possible Text Values for all Text Attributes relating to a specific category table.

The names of these tables are:
_A2i_FV_x_ where x is the TableId of the HierAttrTable that contains all the categories that these attributes are allowed to link to.

The structure of this table follows:

| SQL field name | SQL Field Type | Description |
| --- | --- | --- |
| AttrId | Int 4, not NULL, part of Primary Key | Attribute Id. Must specify an existing AttrId in the A2i_A_x_ attribute definition table, where x matches. |
| FeatureId | Int 4 ,not NULL, part of Primary Key | Id defining the enumerated value. The Ids start at 0, and should only be unique for all records with the same AttrId. Records with different AttrIds should start again at 0. |
| PermanentId | Int 4, not NULL, Identity (1, 1) | Ever increasing Id used to make sure newly added records are not confused with previous records that had the same id. Oracle does not need the Identity(1,1) descriptor. |
| FeatureName | char 128, not NULL | Human readable description of this attribute. Examples are 'white', 'air valve', 'Pentium II' |
| ImageId | Int 4, not NULL, default 0 | Image Id of this feature's image |
| Position | Int 4, not NULL, default 0 | position of this text value in the display of all text values. Starts at 0 and cannot have gaps, unless all values are 0. If all are 0, the server will set the values to the natural order when you rebuild indices. This allows you to easily convert old database. |

Create a Non-Unique, Clustered Index on AttrId.
Create a Primary Key, Unique Valued Index on AttrId + FeatureId.
Create Unique Valued Index on AttrId + Position Note : FeatureId should only be unique for records with the same AttrId. Each time the AttrId changes, start FeatureId at 0 again. This allows us to use smaller structures to store the Feature Id's in memory resulting in less memory usage and faster searches.

Feature Entries Tables

This is where all the Feature data is. These tables store the actual Text values selected for a particular Feature Attribute of a particular record.

The names are:
_A2i_F_x_
> where x is the TableId of the HierAttrTable that contains all the categories that the attributes are allowed to link to.

The structure of this table follows:

| SQL field name | SQL Field Type | Description |
|---|---|---|
| Id | Int 4, not NULL | Main Product Id. Must specify an existing Id in the _A2i_x_ primary table, where x matches this table. |
| AttrId | Int 4, not NULL | Attribute Id. Must specify an existing AttrId in the _A2i_A_x_ attribute definition table, where x matches. |
| FeatureId | Int 4, not NULL | Defines the enumerated value. Must specify an existing FeatureId in the _A2i_FV_x_ Feature Enumerated Value table. |
| Position | Int 4, not NULL | The ordering position for multiple features of a record. Beginning with 0, each position is unique per Id. |

Create a non-Unique Valued, Clustered Index on Id, very important for performance
Create a Unique Valued Index on Id + AttrId + FeatureId
Create a non-Unique Valued, Index on Id + AttrId
Create a non-Unique Valued, Index on AttrId + FeatureId A record in this table indicates that for the record matching Id, its Attribute matching AttrId has the Text Value matching FeatureId.

Characteristic Entries Tables

This is where all the Numeric Attribute data is. These tables store the actual Numeric values selected for a particular attribute of a particular record.

The names are:
_A2i_C_x_
> where x is the TableId of the HierAttrTable that contains all the categories that the Characteristic Attributes are allowed to link to.

The structure of this table follows:

| SQL field name | SQL Field Type | Description |
| --- | --- | --- |
| Id | Int 4, not NULL, part of Primary Key. | Main Product Id. Must specify an existing Id in the _A2i_x_ primary table, where x matches this table. |
| AttrId | Int 4 not NULL, part of Primary Key | Attribute Id. Must specify an existing AttrId in the _A2i_A_x_ attribute definition table, where x matches. |
| CharType | TinyInt 1, not NULL, part of Primary Key | Characteristic type. Must be exactly one of the possible flags set in the AttrType field of the_A2i_A_x_ attribute definition table for the attribute with AttrId equal to the previous field's value. There should be one record in this table for each flag set in the attribute definition table for the Attribute defined by AttrId for every main product Id |
| Value | Real 4, not NULL | Actual value of this attribute. For example 3 1/4 inches would be 3.25 |
| Position | Int 4, not NULL | The ordering position for multiple attributes of a record. Beginning with 0, each position is unique per Id. |
| Units | Int 4, not NULL | Type of units for the Value field above. This is an enumeration whose valid values and descriptions depend on the AttrParam field in the attribute definition table for the attribute with AttrId. Currently these are:<br>If AttrParam =<br>  0 (none), Units can be<br>    0 - none<br>  1(length), Units can be<br>    1 = mm<br>    2 = inches |

Create a non-Unique Valued, Clustered Index on Id, very important for performance
Create a Unique Valued Index on Id + AttrId + CharType
Create a non-Unique Valued, Index on Id + AttrId

Coupled Numeric Entries Tables

This is where all the Coupled Numeric Attribute data is. These tables store pairs of actual Numeric values selected for a particular attribute of a particular record.

The names are:
_A2i_CN_x_
    where x is the TableId of the HierAttrTable that contains all the categories that the Characteristic Attributes are allowed to link to.

The structure of this table follows:

| SQL field name | SQL Field Type | Description |
|---|---|---|
| Id | Int 4, not NULL | Main Product Id. Must specify an existing Id in the _A2i_x_ primary table, where x matches this table. |
| AttrId | Int 4 not NULL | Attribute Id. Must specify an existing AttrId in the _A2i_A_x_ attribute definition table, where x matches. |
| Value | Real 4, not NULL | Actual value for the left side this attribute. For example 3 1/4 inches would be 3.25 |
| Units | Int 4, not NULL | Type of units for the Value field above. This is an enumeration whose valid values and descriptions depend on the MeasurementType field in the attribute definition table for the attribute with AttrId. See the current units schedule for a list of unit types. |
| CoupledValue | Real 4, not NULL | Actual value for the right side of this attribute. For example 3 1/4 inches would be 3.25 |
| CoupledUnits | Int 4, not NULL | Type of units for the Value field above. This is an enumeration whose valid values and descriptions depend on the MeasurementType field in the attribute definition table for the attribute with AttrId. See the current units schedule for a list of unit types. |
| Position | Int 4, not NULL | The ordering position for multiple attributes of a record. Beginning with 0, each position is unique per Id. |

Create a non-Unique Valued, Clustered Index on Id, very important for performance
Create a Unique Valued Index on Id + AttrId + Position
Create a non-Unique Valued, Index on AttrId
Create a Unique Valued, Index on Id + AttrId + Value + Units + CoupledValue + CoupledUnits Following is an example of some couples _____350 hp @ 2500 rpm _____375 hp @ 3000 rpm

Matching Sets Table

Quick description of matching sets

Matching sets are a way of associating products in one category with products in another category. For example Nuts and Bolts are two categories. The products in the Nuts category match the products in the Bolts category if their Width and Thread Pitch match. A matching consists of the two categories and a list of the common attributes that must match for a product to be considered a match.

The matching set tables store the matching set information. The names are

_A2i_MS_$x$_ where x is the TableId of the HierAttrTable that contains the categories that have the groupings.

No primary key is needed

| SQL field name | SQL Field Type | Description |
| --- | --- | --- |
| Id1 | Int 4, not NULL | Category Id. Must specify an existing Id in the _A2i_x_ primary table, where x matches this table. |
| Id2 | Int 4, not NULL | Category Id. Must specify an existing Id in the _A2i_x_ primary table, where x matches this table. |
| Cat1AttrId | Int 4 not NULL | Attribute Id. Must specify an existing AttrId in the _A2i_A_x_ attribute definition table, where x matches. |
| Cat1Rating | Int 4 not NULL | For Text Attributes, this always equals –1. For Numeric Attributes, this is the rating to match on. If the value is set to –1 for numeric attributes, the first available rating will be chosen and written to sql when you start the database with the rebuild indices option. This allows easy updating of previous databases |
| Cat2AttrId | Int 4 not NULL | same as Cat1AttrId |
| Cat2Rating | Int 4 not NULL | same as Cat1Rating |

Ix_MS_x_Id1, non-unique index on Id1

Ix_MS_x_Id2, non-unique index on Id2

Family Tables

Families

Quick description of families.
Families are a way of grouping records by structured queries, then assigning common information to the groups and organizing each group's display of its records. Each group of records is called a family.

Families are created by Partitioning the records based on a category, then sub-partitioning these groups based on other categories or attributes. With the exception of the first partition, families only exist where the combination of values in the partitioned fields/attribute results in a non-zero set of records.

The first partition is special in a few ways:
1) Its partition field is specified in the _A2i_Server_ table, FamilyCatFieldId
2) It can only be a field, not an attribute, because attribute do not exist at a global level
3) If you wish to partition on attributes, the category field that uses attributes must be this first partition
4) Families in the first partition ALWAYS exists even if no records belong to them. This is a convenience to allow some initial family setup before all the data is entered.

Within a group, the records can be Pivoted by Depth, Vertically or Horizontally. This extracts the values of the pivot field and makes a separate section for records with that value.

Family Structure Table

This table holds all the partition, pivot, sorting, ordering and hidden information. Structure is tied to a family node. All children then inherit it, unless the child overrides the inheritance. Children can override each type of structure element individually.

Partition – This determines the hierarchy of the family tree. Only main table lookup fields, and Text Attributes are allowed in the partition. Numeric attributes are not allowed. Every time you add a field/attribute to the partition, you create additional child family nodes below the current child nodes. The records will be split up according to the values they have for the new partition field/attribute.

Pivot (Depth, Vertical, Horizontal) – This also splits up records into groups, but is used for display only. It does not create new family nodes Sorting – This specifies which fields/attributes to sort on in the final display. More than one field/attribute can be used. The display will sort first on the first field/attribute, then on the second, etc.

Ordering – This is the display order of the fields/attributes in the final display.

Hidden – This is a list of fields/attributes that should not be displayed.

Partition and Pivot allow you to concatenate multiple fields at the same level. This has a slightly different effect than placing the fields on different levels. For example, a family has 2 attributes available for partitioning, Color(red, blue) and Horsepower(gutless, gas-guzzler). Creating 2 partition levels, the first with Color and the second with Horsepower would look like.

red family
    gutless family
    gas-guzzler family
blue family
    gutless family
    gas-guzzler family If you added a single partition level with Color and Horsepower, Color would be in NestedPosition = 0, Horsepower in NestedPosition = 1, and you'd get red - guttless family
blue - gas-guzzler family
red - guttless family
blue - gas-guzzler family The name of the table is \_A2i\_FamilyStructure\_

The structure of this table follows:

| SQL field name | SQL Field Type | Description |
|---|---|---|
| FamilyItemId | Int 4, not NULL | Family Item Id, root has ItemId = 0, others continue from 1 on up. |
| StructureType | Int 4, not NULL | Structure type specified:<br>1 = FamilyPartition<br>2 = FamilyDepthPivot<br>3 = FamilyHorizontalPivot<br>4 = FamilyVerticalPivot<br>5 = FamilySorting<br>6 = FamilyOrdering<br>7 = FamilyHidden |
| NestedPosition | Int 4, not NULL | Position for Structure Type in this Family. Starts with 0, the next additional position is 1, etc. |
| ConcatenationPosition | Int 4, not NULL | Position within a NestedPosition that this item exists in. The first position is 0, then 1 and so on.<br>For StructureTypes 5,6,7 this is always 0.<br>For StructureTypes 1,2,3,4, you may have more than 1 field specified for a partition or pivot, in that case the second field has position 1, and so on. |
| FieldOrAttrId | Int 4, not NULL | Main Table Field Id or Attribute field Id |
| IsAttributeField | Bit, not NULL | Whether this is an attribute or a main table field |
| Rating | Int 4, not NULL | If not an attribute field set it to 0.<br>For Features set it to –1(InvalidRating)<br>For Characteristic set it to the one of the following values<br>    1 = Minimum<br>    2 = Maximum<br>    4 = Typical<br>    8 = Nominal<br>    16 = Average |
| SortType | Int 4, not NULL | Only used for Structure Type 5(FamilySorting).<br>    1 = ascending |

|  |  | 0 = descending |
|---|---|---|

Create a Unique Index on FamilyItemId, StructureType, NestedPosition, ConcatenationPosition

Family Structure Recycled Table

This table holds information about familiy nodes that have been deleted, but had family structure information defined.

The name of this table is
_A2i_FamilyStructureRecycled_

The structure of this table follows:

| SQL field name | SQL Field Type | Description |
|---|---|---|
| FamilyItemId | Int 4, not NULL | Recycled Family Item Id, start from 1 on up. No root is necessary |
| StructureType | Int 4, not NULL | Structure type specified:<br>1 = FamilyPartition<br>2 = FamilyDepthPivot<br>3 = FamilyHorizontalPivot<br>4 = FamilyVerticalPivot<br>5 = FamilySorting<br>6 = FamilyOrdering<br>7 = FamilyHidden |
| NestedPosition | Int 4, not NULL | Position for Structure Type in this Family. Starts with 0, the next additional position is 1, etc. |
| Concatenation Position | Int 4, not NULL | Position within a NestedPosition that this item exists in. The first position is 0, then 1 and so on.<br>For StructureTypes 5,6,7 this is always 0.<br>For StructureTypes 1,2,3,4, you may have more than 1 field specified for a partition or pivot, in that case the second field has position 1, and so on. |
| FieldOrAttrId | Int 4, not NULL | Main Table Field Id or Attribute field Id |
| IsAttributeField | Bit, not NULL | Whether this is an attribute or a main table field |
| Rating | Int 4, not NULL | If not an attribute field set it to 0.<br>For Features set it to –1(InvalidRating)<br>For Characteristic set it to the one of the following values<br>    1 = Minimum |

|  |  | 2 = Maximum<br>4 = Typical<br>8 = Nominal<br>16 = Average |
| --- | --- | --- |
| SortType | Int 4, not NULL | Only used for Structure Type 5(FamilySorting).<br>1 = ascending<br>0 = descending |

Create a Unique Index on FamilyItemId, StructureType, NestedPosition,

ConcatenationPosition

*Family Items Table*

This table holds basic information about the family. It is a global table that applies to the main table in the database.

_A2i_FamilyItems_

| SQL field name | SQL Field Type | Description |
| --- | --- | --- |
| FamilyItemId | Int 4, not NULL | Family Item Id, unique, root has Id = 0, others continue from 1 on up. |
| ParentId | Int 4, not NULL | Parent Id of this item |
| RelativePosition | Int 4, not NULL | Relative position of this family item within its siblings. Because families only exist where their query results in a non-empty set of records, not all combinations of the partitioned fields result in families. The relative position is based on the actual position of the partitioned fields' attributes |
| InheritPartition | Bit, not NULL | 1 when family item inherits this value from its parent |
| InheritDepthPivot | Bit, not NULL | 1 when family item inherits this value from its parent |
| InheritVerticalPivot | Bit, not NULL | 1 when family item inherits this value from its parent |
| InheritHorizontalPivot | Bit, not NULL | 1 when family item inherits this value from its parent |
| InheritSorting | Bit, not NULL | 1 when family item inherits this value from its parent |
| InheritOrdering | Bit, not NULL | 1 when family item inherits this value from its parent |
| InheritHidden | Bit, not NULL | 1 when family item inherits this value from its parent |

Create a Clustered, Unique Index on FamilyItemId

This table requires an initial ROOT node with the following values
   ItemId = 0
   ParentId = -1
   RelativePosition = -1
   Inherit* = 1 (all inherits set to 0)

Note : the user may assign structure information to this root node, so the inherit* values may change.

Since the first partition always results in families, this table must be initialized with all the values in the category table chosen as the first partition. The ItemId, ParentId, and RelativePosition may be initially set to the same value in the category table. Although these values may diverge after time.

*Family Items Recycled Table*

This table holds basic information about family nodes that have been deleted, but contained links to common information or structure. This allows users to recover their work when then make a change that destroys these families _A2i_FamilyItemsRecycled_

| SQL field name | SQL Field Type | Description |
|---|---|---|
| FamilyItemId | Int 4, not NULL | Family Item Id |
| Description | Varchar 255, not NULL default empty string | Description of the family node. Since the position in the family hierarchy is lost by deleting a node, this description is a path to where the family used to be. i.e. Category:Bearings->Mfr:SKF->Type:ball. |
| InheritPartition | Bit, not NULL | 1 when family item inherits this value from its parent |
| InheritDepthPivot | Bit, not NULL | 1 when family item inherits this value from its parent |
| InheritVerticalPivot | Bit, not NULL | 1 when family item inherits this value from its parent |
| InheritHorizontalPivot | Bit, not NULL | 1 when family item inherits this value from its parent |
| InheritSorting | Bit, not NULL | 1 when family item inherits this value from its parent |
| InheritOrdering | Bit, not NULL | 1 when family item inherits this value from its parent |
| InheritHidden | Bit, not NULL | 1 when family item inherits this value from its parent |

Create a Clustered, Unique Index on FamilyItemId

*Family Item Values Table*

This table holds the information describing the partial query for each family node. Every node represents 1 or more criteria. Tracing the node back to the root gives you the entire query.

Nodes are allowed to have more than 1 field/value combination. This occurs when an ancestors partition specified more than 1 field for the partition's NestedPosition. This node then represents a concatenation of values.

This Family has the name
_A2i_FamilyItemValues_

| SQL field name | SQL Field Type | Description |
| --- | --- | --- |
| FamilyItemId | Int 4, not NULL | Family Item Id |
| FieldOrAttrId | Int 4, not NULL | Field or Attribute Id this value corresponds to |
| FieldOrAttrValue | Int 4, not NULL | Value of field. Since only lookup fields, and Text Attributes are allowed in the partition, this value is always a Uint32 |
| IsAttributeField | Bit, not NULL | Whether this is a lookup field value, or attribute text value |
| ConcatenationPosition | Int 4, not NULL | Where in the concatenation of values this value exists. This starts at 0, and continues if more than 1 field are concatenated at this partitions NestedPosition. |

Create a Clustered, non-Unique Index on FamilyItemId

Create a Unique Index on FamilyItemId + ConcatenationPosition

The initial table needs a definition for the ROOT node.
ItemId = 0
FieldId = {main table category field Id used as base category field for family tree}
FieldValue = 0
IsAttributeField = 0
ConcatenationPosition = 0

*Family Fields Table*

This table specifies which fields all families have. Just like primary tables, families can have fields. The field values apply to all records in the family.

The name of this table is
_A2i_FamilyFields_

| SQL field name | SQL Field Type | Description |
| --- | --- | --- |
| PermanentId | Int 4, not NULL, Identity (1, 1) | Ever increasing Id used to make sure newly added records are not confused with previous records that had the same id. Oracle does not need the Identity(1,1) descriptor. |
| FamilyFieldId | Int 4, not NULL | FieldId, starting at 1 |
| FamilyFieldName | Varchar 50, not NULL | name of field |
| FamilyFieldType | Int 4, not NULL | Type of field. For now, all fields must be object data fields, valid types are<br>12 – TextField<br>13 – MultiTextField<br>14 – ImageField.<br>15 – MultiImageField<br>16 – SoundField (NYI)<br>17 – MultiSoundField, NYI<br>18 – VideoField, NYI<br>19 – MultiVideoField, NYI<br>20 - NOT USED<br>21 - NOT USED<br>22 – ExtField, NYI<br>23 – MultiExtField, NYI<br>31 – MultiTemplateField, NYI<br>32 – PDFDocumentField, NYI<br>33 – MultiPDFDocumentField, NYI |
| LookupTableId | Int 4, not NULL | The table Id of the object table that this field's values correspond to. |

Create a Clustered, Non-unique Index on FamilyFieldId

*Family Record Values Table*

This holds the values set for the Family Fields for all family items. This table is like the Attribute _c_ and _f_ table in that if a family item does not have a value set, nothing is stored.

The name of this table is
_A2i_FamilyRecVals_

| SQL field name | SQL Field Type | Description |
| --- | --- | --- |
| FamilyItemId | Int 4, not NULL | Family Item Id |
| FamilyFieldId | Int 4, not NULL | Family Field Id |
| Value | Int 4, not NULL | Value. This corresponds to a record in the object table linked to this field. This cannot be 0. If more than one value are set for a field (multi-valued fields) there will be more than one entry in this table for that field |

Create a Clustered, Non-unique Index on FamilyItemId
Create a Unique Index on FamilyItemId, FamilyFieldId, Value

*Family Record Values Recycled Table*

This holds information for deleted family items that had fields set

The name of this table is
_A2i_FamilyRecValsRecycled_

| SQL field name | SQL Field Type | Description |
| --- | --- | --- |
| FamilyItemId | Int 4, not NULL | Family Item Id |
| FamilyFieldId | Int 4, not NULL | Family Field Id |
| Value | Int 4, not NULL | Value. This corresponds to a record in the object table linked to this field. This cannot be 0. If more than one value are set for a field (multi-valued fields) there will be more than one entry in this table for that field |

Create a Clustered, Non-unique Index on FamilyItemId
Create a Unique Index on FamilyItemId, FamilyFieldId, Value

*Family Column Names Table*

This holds information about family column names.

The name of this table is
_A2i_FamilyColumnNames_

| SQL field name | SQL Field Type | Description |
|---|---|---|
| FamilyItemId | Int 4, not NULL | Family Item Id |
| FamilyOrAttrId | Int 4, not NULL | Field or Attribute Id this value corresponds to |
| IsAttributeField | Bit, not NULL | Whether this is a lookup field value, or attribute text value linked to this field. This cannot be 0. If more than one value are set for a field (multi-valued fields) there will be more than one entry in this table for that field |
| Rating | Tinyint, not NULL | ????????? |
| DisplayName | Varchar 255, not NULL | Displayed name for the column |

Create a Unique Index on FamilyItemId, FamilyOrAttrId, Rating

Large Object (Lob) Data Tables (images, video, etc)

The organization and structure of large object data (sometime referred to as external or indirect data) is stored in the SQL database. The xCat Server does not cache it.

_A2i_CM_Data_Tables_

This describes the structure of the data tables. These data tables have names _A2i_Data_x_ where x is an Id starting at 1.

| SQL field name | SQL Field Type | Description |
| --- | --- | --- |
| DataTableId | Int 4, not NULL, Primary Key. | Id starting at 1 of the Data Table. The table names will be _A2i_Data_x_ where x is this Id. |
| PermanentId | Int 4, not NULL, Identity (1, 1) | Ever increasing Id used to make sure newly added records are not confused with previous records that had the same id. Oracle does not need the Identity(1,1) descriptor. |
| DataTableType | Int 4 not NULL | Type of table, valid values are: 5, 6, 7, 8, 18 Refer to the Table Type Schedule for a list of TableType values and a description of each. |
| DataTableName | Varchar 255, not NULL | Name of table |

Create a Primary, Unique index on DataTableId

_A2i_CM_Data_Groups_

This is a table of user defined groups that the external data items can be assigned to. It is a way to categories the data items for easy searching at a later time. Each record is a group.

| SQL field name | SQL Field Type | Description |
| --- | --- | --- |
| Id | Int 4, not NULL, Primary Key. | Id of this group starting at 1 |
| ParentId | Int 4 not NULL | Id of this group's parent. This must be −1 for top level groups or an existing Id in this table for child groups |

| GroupName | Varchar 255, not NULL | Name of group |

Create a Primary, Unique index on Id
NOTE: Do not insert a null record

_A2i_CM_Data_Locations_

This hierarchical table describes exactly where the data items are. Data items are assigned ids from this table to specify exactly where they are.

| SQL field name | SQL Field Type | Description |
|---|---|---|
| Id | Int 4, not NULL, Primary Key. | Id of this location starting at 1 |
| ParentId | Int 4, not NULL | Id of this location's parent. This must be –1 for top level locations or an existing Id in this table for child locations. |
| Name | Varchar 50, Not NULL | Name of location. Each name is part of a universal path, so the name must conform to file and directory naming restrictions. No backslashes \ are allowed in the name. |
| Type | Int 4, not NULL | Type of location. Valid types and their meanings are: |
| | | 1 – PhysicalLocation, This is a physical location such as A2I, Century City Office, or Server Room. PhysicalLocations start at the top of the hierarchy. |
| | | 2 – ComputerLocation, This is the network name of the computer where item data can reside. These locations appear direcly under Physical Locations and before any volume information. |
| | | 3 – SharedFixedDeviceLocation, This is a shared network volume such as big_vol, data or catalogs. It comes after ComputerLocation and before RelativePathLocation in the hierarchy. |
| | | 4 – LocalFixedDeviceLocation, This is a local permanent disk drive. Usually named c$ or d$ to indicate the c: or d: drive. It comes after ComputerLocation and before RelativePathLocation in the hierarchy. |
| | | 5 – RemovableDeviceLocation, This is a local removeable drive such as a cd-rom drive. It is usually named e$ to indicate the e: drive. This comes after ComputerLocation and before |

|   |   |
|---|---|
|   | RemovableMediaLocation in the hierarchy. |
|   | 6 – RemovableMediaLocation, This is the volume name of the removable disk. It comes after the RemovableDeviceLocation and before RelativePathLocation. |
|   | 7 – RelativePathLocation, This is a part of a relative path on a drive. It represents 1 directory. Subdirectories will be be children of their parent RelativePathLocations. |

Create a Primary, Unique index on Id

NOTE: the description field has been removed

Each record represents 1 part in a part of locations. And example is
A2iUSA\Dave_Office\sullivan\d$\work\images\testImages The records that make this up would be:
(Id, ParentId, type, name)

| | | | |
|---|---|---|---|
| 1, | -1, | PhysicalLocation, | A2iUSA |
| 2, | 1, | PhysicalLocation, | Dave_Office |
| 3, | 2, | ComputerLocation, | sullivan |
| 4, | 3, | LocalFixedDeviceLocation, | d$ |
| 5, | 4, | RelativePathLocation, | work |
| 6, | 5, | RelativePathLocation, | images |
| 7, | 6, | RelativePathLocation, | testImages |

_A2i_G_x_

This table is no longer used and can be removed from any existing databases

_A2i_CM_Data_Views_

This table is no longer used and can be removed from any existing databases

_A2i_CM_Publications_

| SQL field name | SQL Field Type | Description |
|---|---|---|
| Id | Int 4, not NULL, Primary Key. | Id of this publication starting at 1 |
| Name | Varchar 255 | name of the publication |

Create a Primary, Unique index on Id

_A2i_Publications_x_

This table describes a publication, represented as a tree. "x" in the table name corresponds to an entry in the _A2i_CM_Publications_ table.

| SQL field name | SQL Field Type | Description |
|---|---|---|
| Id | Int 4, not NULL | Id of this record, starting at 1 |
| Parent | Int 4, not NULL | Record Id of this record's parent, root id's parent is –1 |
| Type | Int 4, not NULL | Publication type:<br>1 - ??? (To Be Determined)<br>2 - ??? (etc) |
| Position | Int 4, not NULL | Position relative to other siblings of the same parent, starting at 1 |
| Parent | Int 4, not NULL | Record Id of this record's parent, root id's parent is –1 |
| Name | Varchar 255 | Displayed name of the publication |
| Data | Image, not NULL | Binary Object. Structure is ... |

Create a Primary, Unique index on Id

_A2i_CM_Media_

This table contains user-defined descriptions of the media type of the item data.

| SQL field name | SQL Field Type | Description |
|---|---|---|
| Id | Int 4, not NULL, Primary Key. | Id of this media type starting at 1 |
| Media | Varchar 50 | name of the media |
| ParentId | Int 4, not NULL | Id of parent media type. Top level media types have a ParentId of -1 |

Create a Primary, Unique index on Id

_A2i_Data_x_

These tables contain the definitions of the data items. Each record represents a single data item. All data tables have the first 5 fields in common.

| SQL field name | SQL Field Type | Description |
|---|---|---|
| DataId | Int 4, not NULL, Primary Key. | Id of this data item starting at 1, there is no record 0. |
| OrigMediaId | Int 4, not NULL, default 0 | Id of the original media type, must be zero (indicating that no media type is assigned) or a valid Id in the _A2i_CM_Media_ table |
| OrigLocationId | Int 4, not NULL, default 0 | Id of the original location, must be a valid Id in the _A2i_CM_Locations_ table |
| DataGroupId | Int 4, not NULL, default 0 | Id of the group this item belongs to. Must be a valid Id in the _A2i_CM_Data_Groups_ table |
| DataSize | Int 4, not NULL, default 0 | Size in bytes of the stored data object. For the TextTable type, the size is the sum of both TextStart and TextRest |

Create Primary, Unique index on DataId

Each type of data table (text, image, pdf, video, sound) has additional fields. Currently only the image, text and pdf tables are fully defined.

Text Table (Type 5) additional fields

| SQL field name | SQL Field Type | Description |
|---|---|---|
| TextStart | Varchar 255, not NULL | first 255 characters of text |
| TextRest | Text | remaining text | no other supporting tables

PDF Table (Type 18) additional fields

| SQL field name | SQL Field Type | Description |
|---|---|---|
| OrigName | Varchar 255, not NULL | Original name of this item |
| HasOriginal | Bit, not NULL, default 0 | Specifies whether or not the original pdf is stored in the sql database. If so, there will be a |

|  |  | record with the same DataId in the corresponding _A2i_Originals_x_ table which resides in the *[DatabaseName]* Originals database |
|---|---|---|

PDF tables have supporting tables in the {database}_Originals or {database}O database.
The supporting table is _A2i_Originals_x_ where x matches the Id of the main database table

| SQL field name | SQL Field Type | Description |
|---|---|---|
| DataId | Int 4, not NULL | Id matching Id in main database |
| PDF | Image, not NULL | Actual pdf document |

Image Table (Type 6) additional fields

| SQL field name | SQL Field Type | Description |
|---|---|---|
| OrigName | Varchar 255, not NULL | original name of this item |
| ProcessedName | Varchar 255, not NULL | optional new name after processing |
| Width | Int 4, not NULL. | Width in pixels of image |
| Height | Int 4, not NULL | Height in pixels of image |
| HasOriginal | Bit, not NULL | Specifies whether or not the original images is stored in the sql database. If so, there will be a record with the same DataId in the corresponding _A2i_Originals_x_ table which resides in the *[DatabaseName]*Originals database |
| Format | Int 4, not NULL | Format of the image.<br>1 - BMP<br>2 - GIF<br>3 - JPEG<br>4 - TIFF<br>5 - PCD<br>6 - EPS<br>7 - PNG<br>8 - PSD |
| Zipped | Bit, not NULL | Specifies if the original image stored in the database is zipped. |

Image tables have support tables in the {database}_Originals and {database}_Thumbnails databases.

In the {database}_Originals or {database}O, the supporting table is _A2i_Originals_x_ where x matches the Id of the main database table

| SQL field name | SQL Field Type | Description |
|---|---|---|
| DataId | Int 4, not NULL | Id matching Id in main database |
| Original | Image, not NULL | Original (not altered) image |

In the {database}_Thumbnails or {database}T, the supporting table is _A2i_Thumbnails_x_ where x matches the Id of the main database table

| SQL field name | SQL Field Type | Description |
|---|---|---|
| DataId | Int 4, not NULL | Id matching Id in main database |
| Thumbnail | Image, not NULL | Thumbnail image generated from the original, currently bounded by (200 x 200) box. |

For each _A2i_Originals_x_ and _A2i_Thumbnails_x_, create a unique primary index on DataId.

Image Variant Tables

Images in the Catalog Manager can be processed to various specifications and stored. An Image Variant is the term used to describe a processed image.

_A2i_Img_Filters_

Filters table. (Currently not used)

| SQL field name | SQL Field Type | Description |
|---|---|---|
| FilterId | Int 4, not NULL | Id of the filter. |
| Filter | Image, not NULL | |

Create a Unique index on FilterId

_A2i_Img_Scripts_

Scripts table. (Currently not used)

| SQL field name | SQL Field Type | Description |
|---|---|---|
| ScriptId | Int 4, not NULL | |
| ScriptName | Varchar 50, not NULL | |

Create a Unique index on ScriptId

_A2i_Img_SF_

Script-Filter table. (Currently not used)

| SQL field name | SQL Field Type | Description |
|---|---|---|
| ScriptId | Int 4, not NULL | |
| FilterId | Int 4, not NULL | |

Create a Unique index on ScriptId, FilterId

_A2i_Img_Variants_

Variants Table. This is the directory for all Variant tables in the database.

| SQL field name | SQL Field Type | Description |
|---|---|---|
| VariantId | Int 4, not NULL | Id of this Variant |

| VariantName | Varchar 128, not NULL | Name of the variant |
|---|---|---|
| Width | Int 4, not NULL | Bounding Width |
| Height | Int 4, not NULL | Bounding Height |
| OptimizeStorage | Int 4, not NULL | |
| IVScalingMode | Int 4, not NULL | |
| OutputResolution | Int 4, not NULL | |
| IVColorMode | Int 4, not NULL | |
| IVPaletteType | Int 4, not NULL | |
| IvColorReductionMethod | Int 4, not NULL | |
| IccProfile | Varchar 255, not NULL | Path of ICC Profile |
| GammaCorrection | Int 4, not NULL | |
| IVOutputFormat | Int 4, not NULL | |
| IVSubformat | Int 4, not NULL | |
| AddBorders | Int 4, not NULL | |
| BorderRGB | Int 4, not NULL | |
| BorderTopPixels | Int 4, not NULL | |
| BorderBottomPixels | Int 4, not NULL | |
| BorderLeftPixels | Int 4, not NULL | |
| BorderRightPixels | Int 4, not NULL | |
| AddWatermark | Int 4, not NULL | |
| IVWatermarkType | Int 4, not NULL | |
| WatermarkSize | Int 4, not NULL | |
| IVWatermarkPosition | Int 4, not NULL | |

Create Primary, Unique index on VariantId

_A2i_Img_VIS_

Variant-Image-Script table. There is only one _A2i_Img_VIS_ table in one database. This table stores information about all Variant images.

| SQL field name | SQL Field Type | Description |
|---|---|---|
| VariantId | Int 4, not NULL | |
| ImageId | Int 4, not NULL | |
| ScriptId | Int 4, not NULL | |
| Status | Int 4, not NULL | |
| DataSize | Int 4, not NULL | |
| Width | Int 4, not NULL | |
| Height | Int 4, not NULL | |
| Format | Int 4, not NULL | |

Create an index on VariantId
Create a Unique index on VariantId, ImageId

_A2i_Images_

The actual image variant data is stored in a Variant database (its name is stored in table A2i_xCat_DBs). There's only one table in this database named as "_A2I_Images_"

| SQL field name | SQL Field Type | Description |
|---|---|---|
| DataTableId | Int 4, not NULL | |
| VariantId | Int 4, not NULL | |
| DataId | Int 4, not NULL | |
| Variant | Image, not NULL | |
| CrcOfOriginal | Int 4, Not NULL | CRC of Original Image when Variant was set |

Create a Unique index on DataTableId, VariantId, DataId

GRAVEYARD
Publishing catalogs of product information to paper and to electronic media are two very distinct processes, with very different standards and expectations for quality. Paper catalogs have been meticulously laid out a page at a time by populating page layout programs with product data, a process that is manual, time-consuming, tedious and very, very expensive, but has typically resulted in high page density, flexible and well-structured tabular layout formats, and a very high overall standard of quality. By contrast, electronic catalogs have been generated programmatically in real-time but have comparably primitive presentations and are of relatively low quality. The challenge is to eliminate the distinctions between paper and electronic output and combine the best of both media in a way that dramatically reduces the cost of laying out paper catalogs by flexibly and programmatically generating page layouts automatically and in real time, and at the same time brings the structure and high standard of quality to electronic catalog pages without custom programming.

Thus a method and apparatus for dynamically formatting and tabular data in real time has been described. The invention, however, is defined by the claims and the full scope of any equivalents.

What is claimed is:

1. In a computer system, a method for presenting family data comprising:

obtaining family data comprising a group of records related by at least one common value, wherein said family data comprises a subset of a hierarchical structure defined by a partition wherein said partition is stored in a partition table separate from said family data and wherein said partition table comprises at least one record comprising a field or attribute in said family data and wherein said field or said attribute is associated with a family ID wherein said at least one record in said partition table defines said partition and wherein said partition is layered upon an existing taxonomy in said family data and wherein said taxonomy comprises a category field and at least one further field comprising a manufacturer field;

presenting a visual representation of said family data to a user;

obtaining at least one pivot value from a user, wherein said at least one pivot value comprise data associated with said family data;

storing said at least one pivot value in said computer system independent of said family data;

dynamically applying said at least one pivot value to said family data during at least one pivot operation by activating one user interface element without stepping through multiple wizard windows, wherein said at least one pivot operation generates a first preview table of said family data wherein said group of records in said first preview table depends on said at least one pivot value; and, presenting a visual representation of said first preview table to said user.

2. The method of claim 1 further comprising:

obtaining at least one additional pivot value from said user;

dynamically applying said at least one additional pivot value to said first preview table;

regenerating said first preview table to form a second preview table, wherein said group of records in said second preview table depends on said at least one additional pivot value.

3. The method of claim 1 further comprising:

obtaining at least one different pivot value from said user, wherein said at least one different pivot value differs from said at least one pivot value;

dynamically applying said at least one different pivot values to said table;

regenerating said first preview table to form a second preview table, wherein said group of records in said second preview table depends on said at least one different pivot value.

4. The method of claim 1 wherein said step of dynamically applying said at least one pivot value executes in real-time upon obtaining said at least one pivot value.

5. The method of claim 1 wherein said obtaining family data comprising a group of records related by at least one common value comprises:

obtaining a taxonomy comprising at least one category field, said taxonomy comprising said hierarchical structure;

utilizing said at least one category field to define said partition in a partitioning hierarchy;

layering said partitioning hierarchy on top of said taxonomy.

6. The method of claim 5 further comprising:

defining an additional partition on said partitioning hierarchy.

7. The method of claim 5 where said at least one pivot operation is performed at any level in said partitioning hierarchy.

8. The method of claim 1 wherein said step of obtaining at least one pivot value from said user comprises:

obtaining layout information.

9. The method of claim 8 wherein said layout information comprises inheritance properties associated with child nodes of said portioning hierarchy.

10. The method of claim 9 wherein said layout information comprises information for overriding said inheritance properties on a node-by-node basis.

11. The method of claim 1 wherein said at least one pivot operation reduces redundant information shown in said first preview table.

12. The method of claim 1 wherein said at least one pivot operation utilizes said at least one pivot value to execute at least one stack pivot.

13. The method of claim 12 wherein at least one additional stack pivot is nested with said at least one stack pivot.

14. The method of claim 1 wherein said at least one pivot operation utilizes said at least one pivot value to execute at least one horizontal pivot.

15. The method of claim 14 wherein at least one additional horizontal pivot is nested with said horizontal pivot.

16. The method of claim 1 wherein said at least one pivot operation utilizes said at least one pivot value to execute at least one vertical pivot.

17. The method of claim 1 wherein said at least one pivot operation comprises:

identifying at least one pivot axis in a table wherein said pivot axis corresponds to said at least one pivot value;

removing said at least one pivot axis from said table;

generating said first preview table by breaking said first preview table into sub-tables based on said at least one pivot axis.

18. The method of claim 17 wherein said pivot axis comprises a row in said table.

19. The method of claim 17 wherein said pivot axis comprises a column in said table.

20. The method of claim 17 further comprising: sorting said family data into said sub-tables based on said at least one pivot value of said pivot axis.

21. The method of claim 17 wherein said at least one pivot operation comprises a horizontal pivot comprising:

combining said sub-tables into said first preview table by arranging said sub-tables horizontally.

22. The method of claim 21 further comprising: adding an additional row to said preview table comprising said at least one pivot value, said additional row labeling said sub-tables.

23. The method of claim 17 wherein said at least one pivot operation comprises a stack pivot comprising:

combining said sub-tables into said first preview table by arranging said sub-tables vertically.

24. The method of claim 23 further comprising adding an additional row to said first preview table containing said at least one pivot value before each of said sub-tables.

25. The method of claim 23 further comprising:
preserving each of said sub-tables;
labeling said sub-tables with said at least one pivot value.

26. The method of claim 17 wherein said pivot operation comprises a vertical pivot, said vertical pivot comprising: combining sub-tables into said first preview table by arranging said sub-tables vertically.

27. The method of claim 26 further comprising: adding an additional column containing said at least one pivot value to label a group of rows comprising each sub-table.

* * * * *